United States Patent
Hagano et al.

(10) Patent No.: US 6,705,483 B2
(45) Date of Patent: Mar. 16, 2004

(54) FUEL TANK FUELING DEVICE HAVING CAM MECHANISM

(75) Inventors: Hiroyuki Hagano, Aichi-ken (JP); Masayuki Nakagawa, Aichi-ken (JP)

(73) Assignee: Toyoda Gosei, Co., Ltd., Aichi-ken (JP)

(*) Notice: Subject to any disclaimer, the term of this patent is extended or adjusted under 35 U.S.C. 154(b) by 79 days.

(21) Appl. No.: 09/757,643

(22) Filed: Jan. 11, 2001

(65) Prior Publication Data

US 2001/0007324 A1 Jul. 12, 2001

(30) Foreign Application Priority Data

Jan. 12, 2000 (JP) ........................................ 2000-006271
Mar. 27, 2000 (JP) ........................................ 2000-085494
Sep. 6, 2000 (JP) ........................................ 2000-269619

(51) Int. Cl.$^7$ .............................................. B65D 51/16
(52) U.S. Cl. .............................. 220/303; 220/DIG. 33; 220/304; 220/293; 220/295; 220/298
(58) Field of Search ................. 220/203.28, 203.29, 220/293, 295, 298, 300, 301, 302, 303, 304, 375, 288, DIG. 33; 141/350; 280/834

(56) References Cited

U.S. PATENT DOCUMENTS 4,436,219 A * 3/1984 Reutter ........................ 220/295
5,395,004 A * 3/1995 Griffin et al. ................ 220/295
5,540,347 A * 7/1996 Griffin ..................... 220/203.23
5,720,409 A   2/1998 Asakura et al.
5,732,841 A * 3/1998 Jocic et al. .................. 220/304
5,791,507 A   8/1998 Harris et al.
5,794,806 A   8/1998 Harris et al.
6,079,584 A * 6/2000 Griffin ........................ 220/296
6,213,331 B1 * 4/2001 Morgan et al. .............. 220/295

* cited by examiner

Primary Examiner—Robin A. Hylton
(74) Attorney, Agent, or Firm—Posz & Bethards, PLC

(57) ABSTRACT

A fuel tank fueling device for feeding fuel through the fuel passage of an inlet pipe into a tank main body is provided. The fueling device is easier to manipulate when the fuel cap is opened and closed, and also has better fuel tank sealing properties against the outside air. The fueling device includes a handle provided on a casing main body, operated to open and close the fuel passage; a sealing component interposed between the casing main body and the seat surface of the fuel inlet pipe; a spring disposed so as to urge the sealing component against the seat surface; and a cam mechanism whereby the operating force of the handle in the closing direction is converted via the spring into the sealing force of the sealing component pressing against the seat surface.

1 Claim, 37 Drawing Sheets

FUEL TANK FUELING DEVICE HAVING CAM MECHANISM

BACKGROUND OF THE INVENTION

1. Field of the Invention

The present invention relates to a fuel tank fueling device, and more specifically to a fuel cap for a fuel tank fueling device.

2. Description of the Related Art

In conventional fuel tank fueling devices, the fuel cap is opened when fuel is supplied through a fuel inlet pipe. The fuel cap is sealed by pressing a sealing component against the opening (filling neck) of the fuel inlet pipe to prevent fuel vapor in the fuel tank from escaping into the atmosphere. That is, the fuel cap is provided with the sealing component around the periphery of a cylindrical casing. When the fuel cap is screwed onto the opening of the filling neck, the sealing component provides air-tight sealing force, while subject to torque, against the filling neck.

Conventional fuel caps, however, close off the opening by being rotated when attached to the filling neck, so the sealing component is subject to the torque accompanying friction with the filler neck. It has been found that such torque is not readily applied uniformly across the sealing component as a whole, and complicates efforts to improve the sealing properties.

SUMMARY OF THE INVENTION

Therefore, there is a need to overcome the drawbacks in the prior art, by providing a fuel tank fueling device that is easier to operate when opening and closing the fuel cap, and that has better properties in sealing the fuel tank against the outside air.

Accordingly, an exemplary embodiment of the present invention provides a fuel tank fueling device for fueling a fuel tank, through the fuel passage of a fuel inlet pipe. The fuel tank fueling device includes: a casing main body detachably attached to the inlet pipe; a handle provided on the casing main body, the handle being operable to open and close the fuel passage; a sealing component interposed between the casing main body and a seat surface of the fuel inlet pipe; a spring constructed and arranged to press the sealing component against the seat surface; and a cam mechanism constructed and arranged to convert an operating force applied to the handle in a closing direction into a spring pressing force, thereby pressing the sealing component against the seat surface.

In the fuel tank fueling device of an exemplary embodiment, the handle is operated to open the casing main body, and the casing main body is taken out of the fuel inlet pipe, so that fuel passes through the fuel passage of the fuel inlet pipe into a tank main body. When the casing main body is then attached to the fuel inlet pipe, and the handle is operated to close it, the cam mechanism converts the rotating force of the handle into force pressing on the seal member via a spring. This causes the spring to press the seal means against the seat surface, sealing the space between the casing main body and the fuel inlet pipe. The sealing component creates a seal between the casing main body and the fuel inlet pipe by means of the pressure of the urging force of the spring, thus allowing the space subject to torque to be shorter than in the prior art, affording more uniform sealing force, and providing better durability.

The fueling mechanism may have a structure in which a guide is mounted on the inner wall of the fuel dispensing device to rotatably and non-extractably support the casing main body against the fuel inlet pipe.

In an exemplary embodiment, the casing main body includes a rotating casing that has the handle and that is rotatably supported by the guide, and a sliding casing that is equipped with the sealing component and that is slidably disposed in the axial direction relative to the rotating casing by means of the guide, and a spring being disposed between the rotating casing and sliding casing.

In an exemplary embodiment of the present invention, the cam mechanism can convert the rotating force when the handle is rotated in the closing direction into pressure force against the sealing component via the spring. That is, in cases where the casing main body is formed separate from the rotating casing and the sliding casing, the cam mechanism may comprise a cam surface, interposed between the rotating casing and sliding casing, whereby the rotating force of the rotating casing is converted to force in the direction in which the sliding casing acts as a seal via the sealing component.

The cam surface may be disposed in a location apart from the sealing component, including a passage passing from the inside the tank main body of the fuel inlet pipe to the outside. This dispenses with the need for providing separate the sealing component on the cam surface, with the cam mechanism, and simplifies the structure.

The cam surface may also include a detent location, where the seat surface is not sealed by the seal means, while the spring is compressed into a state in which the spring force is accumulated, and a sealing location, where the seat surface is sealed by the sealing component when the sliding casing is allowed to slide in the axial direction against the rotating casing upon the release of the urging force accumulated in the spring when the handle is rotated.

Here, the sealing member may create a seal in the direction allowing the seal force to be increased by the urging force of the spring, and may be mounted on the casing main body or the fuel inlet pipe.

The sealing component may also provide greater sealing force by being pressed against the seat surface by the spring. Accordingly, it is not subject to friction force and torque as in the prior art, thus enabling design with higher sealing properties and greater freedom in the materials for the seal member, surface treatment (state), and shape.

The spring may be a coil spring mounted around the periphery of the casing main body.

In an exemplary embodiment, a pressure valve for adjusting the pressure of the tank main body to within the prescribed range may be housed in the casing main body. This structure allows a pressure regulating valve to be provided in a more compact manner.

In an exemplary embodiment of the present invention, there is also provided a fuel tank fueling device for fueling a tank main body, through the fuel passage of an inlet pipe. The fuel tank fueling device of this embodiment includes: a casing main body detachably mounted on the inlet pipe; a handle disposed on the casing main body for opening and closing the fuel passage; a gasket disposed at an upper part of the casing main body for sealing against a seat surface of the inlet pipe; a spring disposed on the casing main body, the spring constructed and arranged to press the gasket against the seat surface; neck engagement threading formed on an inner wall of the inlet pipe; an upper cam ring disposed rotatably on a periphery of the casing main body and the gasket, rotation of the upper cam ring being blocked by the neck engagement threading; and a lower cam ring movably mounted in an axial direction on a periphery of the casing main body, wherein the lower cam ring is guided along the upper ring at the beginning of the rotating operation of the handle, and is positioned by the neck engagement threading after moving in an axial direction when rotated subsequent to the initial rotation, and is guided in such a way as to press the spring while thus positioned so that the gasket seals the seat surface.

In an exemplary embodiment, there is provided a fuel tank fueling device for fueling a tank main body, through the fuel passage of an inlet pipe. The fuel tank fueling device of this embodiment includes: a rotating casing having support ends and a handle for opening and closing the fuel passage, the rotating casing being detachably and rotatably supported at an opening of the inlet pipe; a sliding casing that is slidably supported in an axial direction relative to the rotating casing, the sliding casing having guide protrusions; a gasket mounted at a bottom of the sliding casing, the gasket sealing a seat surface of the inlet pipe; a spring interposed between the rotating casing and the sliding casing, the spring urging the gasket to press against the seat surface; an annular detent disposed on an inner wall of the inlet pipe, the annular detent having insertion notches used for an insertion of the support ends and engaging with the support ends so that the rotating casing is prevented from being removed from the inlet pipe while being rotatably supported; rotation detents located on the inner wall of the inlet pipe, the rotation detents engaging with the guide protrusions on the sliding casing to block rotation of the sliding casing and to guide the sliding casing in an axial direction; and a cam ring interposed between the rotating casing and the sliding casing, the cam ring having a cam surface causing the sliding casing to move in the axial direction so that the gasket seals, pressed by a spring, seals the seat surface when the rotating casing is rotated a predetermined angle, with the rotation of the sliding casing regulated by the rotation detents.

In an exemplary embodiment, the cam surface may be constructed in such a way that the sealing component is pressed by the urging force of the spring at an initial angle of 5 to 90°, among the operating angle range of 90 to 180° of the handle. The ability to obtain high sealing properties at such a smaller angle affords better operation.

Furthermore, when the sealing component is compressed at such a small angle, the repulsion of the seal means is lower, ensuring better sealing properties. That is, the repulsion force of the sealing component increases moderately with the initial compression, but rises rapidly as the compression increases. Thus, rapid compression of the sealing component can result in excess repulsion, preventing adequate sealing properties from being ensured, or can result in the need for greater torque to rotate the fuel cap. In the present invention, however, the cam mechanism gradually releases the urging force of the spring to compress the sealing component, even when the urging force against the spring increases in the initial stages. The repulsion force of the sealing component is thus lower, with no need for considerable torque for rotating the fuel cap, and better sealing properties may be obtained.

In an exemplary embodiment, the cam surface may be constructed in such a way that the urging force of the spring begins when the initial angle is more than 5°, among the operating angle range of 90 to 180° for the handle. This structure allows the casing main body to be mounted in a reliable manner on the inlet pipe because the handle is rotated more than 95° and produces no tension under the initial 5°.

In an exemplary embodiment, the fuel tank fueling device in which the fuel cap is stopped when a vehicle is fueled includes: a cap retainer for retaining the fuel cap; a flexible cord-shaped tether extending from the cap retainer; a vehicle attachment component for attaching the support end of the tether to the vehicle side component; and a detachable component comprising a detent formed on the cap retainer, and an engaged component that is formed on the vehicle attachment component side of the tether and that is detachable from the engagement component.

In an exemplary embodiment, the fuel cap held by the cap retainer may be stopped by a part on the fuel tank fueling device, i.e., the vehicle attachment component or vehicle attachment component side of the tether. There is thus no need to form a detent for stopping the fuel cap on a part of the vehicle such as a lid panel, and no need to consider the height or size of a detent for the fuel tank fueling device when the body thickness is determined.

The cap retainer of the fuel tank fueling device holds the fuel cap. The cap retainer may be in the shape of a ring, for example. The inside diameter of a cap retainer in the form of a ring should be larger than the outside diameter of the leg of the fuel cap, or the cap retainer should be fitted to a corner of the head of the fuel cap so that the fuel cap may be rotated relative to the cap retainer. This prevents the cap retainer from impeding the rotation of the fuel cap when the fuel cap is removed from or attached to the fueling opening.

The tether of the fuel tank fueling device may extend from the cap retainer, may be flexible, and may be in the form of a cord. The tether may extend from either of the end surfaces or from the outer peripheral surface of the cap retainer. When the tether extends from the outer peripheral surface of the cap retainer, the cap retainer and tether are located in the same plane, thereby allowing the fuel tank fueling device to be made thinner (lower). When the cap retainer is in the form of a ring, the tether may extend at the desired angle from the cap retainer. However, in consideration of the strength and the like with which the tether is bound to the cap retainer, etc., the tether preferably extends in such a way that the line of extension conforms to the hypotenuse of the ring-shaped cap retainer. The thickness and length of the tether should be enough to allow the tether to be easily bent when one of the detachable parts provided on the cap retainer or the like is attached to and detached from the other provided on the vehicle attachment component or the like.

The vehicle attachment component of the fuel tank fueling device attaches the tip of the tether to the vehicle. The vehicle is the part of the body that is exposed when a lid panel is opened, or a lid panel that opens to remove the fuel cap from the fueling opening during fueling, for example. The vehicle attachment component may be formed unitarily with, or separately from, the tether. When the vehicle attachment component is formed unitarily with the tether, the vehicle attachment component may be made of a clip including a base with a flat contact surface forming part of the tether, a diametrically expandable tubular component protruding from the contact surface, and a core that is inserted into the tubular component to diametrically expand the tubular component so that it engages with the edge of the through hole of the lid panel. This allows the structure of the vehicle attachment component and the tip of the tether to be made more compact.

The core may be connected by a U-shaped connector to the tip of the tether. This may prevent the core from being lost when the core temporarily inserted into the tubular component of the clip main body is taken out of the tubular component. The cap retainer, tether, vehicle attachment component, and detachable component may be unitarily formed of a soft resin or the like.

An engagement component may be formed on the outer peripheral surface of the core, allowing the core to be retained by the tubular component while inserted midway into the tubular component. This prevents the core from being lost when the core and tubular component are not connected, and also prevents the core, when connected to the tubular component, from dangling down from the tip of the tether and interfering with the surrounding component. The end of the core base and the engaged component may be connected by a connecting piece when the fuel tank fueling device is shipped or stored, and the connecting piece may be broken off when used. This may prevent the core from dangling down, even when no means has been provided to hold the core while inserted half way into the clip main body as described above.

One of the detachable members of the fuel tank fueling device may be formed on the cap retainer or on the cap retainer side of the tether. When one of the detachable components is formed on the cap retainer, the location where it is formed may be selected as desired according to whether lid panel and fuel cap are on the left or right side surface of the vehicle, or a location where the tether extends, etc. In other words, the fuel tank fueling device as a whole is curved in the shape of a reverse C when the lid panel or the like is on the left side surface of the vehicle, and is curved in the shape of a C when the lid panel or the like is on the right side surface of the vehicle. By contrast, the other detachable member may be formed on the vehicle attachment component, and may be formed on the vehicle attachment component side of the tether. One of the detachable members may be formed on the cap retainer, and the other may be formed on the vehicle attachment component, allowing a shorter tether to be made.

The specific structure of the detachable component may be managed so that the detent is readily operated and then released when the tether is bent to stop the cap retainer near the vehicle attachment component. For example, one of the detachable components may protrude radially and/or axially on the cap retainer, and the other may be formed on the side opposite the surface facing the lid panel of the tether near the vehicle attachment component. A plurality of the one detachable component may be provided on cap retainers to allow the fuel tank fueling device to be jointly used when lid panels and fuel caps are on both the left or right sides of a vehicle, in order to make it easier to detach the other.

The cap retainer, tether, vehicle attachment component and detachable components may be constructed in such a way that the tether, vehicle attachment component, and detachable components are on the inside surface of the ring-shaped cap retainer when the fuel tank fueling device is not being used. This makes it easier to ship and store the fuel tank fueling device, and makes it easier to form the fuel tank fueling device by injection molding or the like.

In an exemplary embodiment, the fuel tank fueling device may comprise a clutch disposed between the casing main body and the handle, and that produces an engaged state in which the casing main body is made to rotate in a unitary manner when the handle is rotated, or an unengaged state in which the casing main body does not rotate in a unitary manner even though the handle is rotated, and a spring urging the clutch in the direction resulting in an unengaged state.

In order to take the fuel cap out of the tank opening in this embodiment, the handle is pressed against the urging force, resulting in the engagement of the clutch, and the handle is rotated, with the clutch in an engaged state. Upon the rotation of the handle, the rotating force is transmitted to the casing, and the casing is fitted to the opening of the tank. The handle is pressed against the urging force of the spring to set the clutch in an engaged state, and is rotated from this engaged state in the direction opposite the opening direction take off the fuel cap and open the tank opening. The clutch is thus pressed into an engaged state to open and close the fuel cap.

While the fuel cap is mounted on the tank opening, the urging force of the spring keeps the clutch in an unengaged state. As a result, even when the handle is subject to force in the rotating direction by unexpected external force, the clutch is in an unengaged state, so the handle turns without catching. The casing thus receives no rotating force from any external force acting on the handle, allowing the tank opening to be kept in a closed state. In other words, even when unexpected external force acts on the fuel cap, the fuel cap will not come loose, and the seal may be preserved.

While the clutch is in an unengaged state, the handle may be rotated without catching, so as to be aligned. The user can thus rotate the handle to the preferred position while the clutch is in an unengaged state, further improving opening and closing operations.

An exemplary embodiment of the clutch comprises an array of gears, such that the gears either interlock or are not interlocked, so as to produce either an engaged or unengaged state, at a location where the handle and casing main body are opposite each other.

An exemplary embodiment of the spring comprises a cantilever piece unitarily protruding from the handle, where one end of the cantilever piece presses on the handle, urging against the handle, or a cantilever piece unitarily protruding from the handle, where one end of the cantilever piece presses on the casing, urging it against the casing. The spring can thus be unitarily formed with the handle or casing to avoid increasing the number of parts.

In an exemplary embodiment, a fueling device featuring the use of the fuel cap, the fuel inlet pipe, handle, and cantilever piece are formed of a conductive substance, and the cantilever piece is located so as to come into contact with the fuel inlet pipe. This structure allows the cantilever piece to act as a ground path through which the charge building up in the handle can escape to the fuel inlet pipe. The cantilever piece thus serves as a spring and a ground path, making it unnecessary to provide a separate ground path, so that the structure is simpler.

BRIEF DESCRIPTION OF THE DRAWINGS

Other features characteristics of the embodiments, as well as the methods of operation of the embodiments and the function and interrelation of the elements of structure, will become more apparent upon consideration of the following non-limiting description and the appended claims with reference to the accompanying drawings, all of which form a part of this disclosure, wherein like reference numerals designate corresponding parts in the various figures, and wherein:

FIGS. 22A and 21B illustrate of the engaged state of the clutch means;

DETAILED DESCRIPTION

While the present invention will hereinafter be described in connection with at least one exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Figure 1:
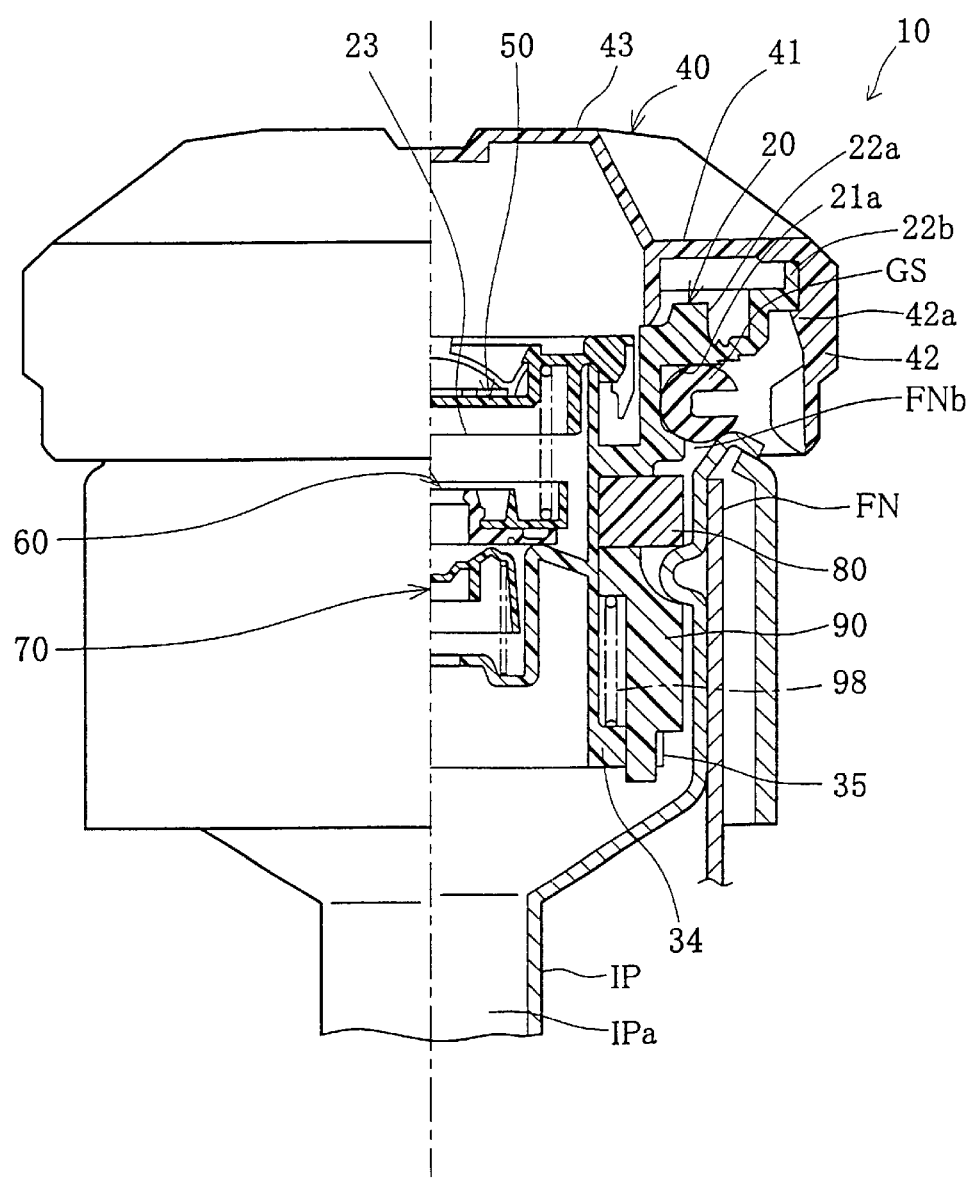
FIG. 1 is a cross section depicting a fueling mechanism equipped with a fuel cap in an embodiment of the present invention.

Throughout the following detailed description, like reference numerals are used to refer to the same element of the invention shown in multiple figures thereof. Referring now to the drawings and in particular to FIG. 1, there is shown a cross section of a fueling mechanism equipped with an exemplary embodiment of a fuel cap 10. As seen in FIG. 1, the fuel cap 10 is mounted on the filler neck FN of an inlet pipe IP dispensing fuel into a fuel tank (not shown), and includes: a casing main body 20 made of a synthetic resin material such as polyacetal; a lid 40 made of a synthetic resin material such as nylon, that is attached to the top of the casing main body 20; an inner lid 50 for closing the upper opening of the casing main body 20 to form a valve chamber 23; a positive pressure valve 60 and negative pressure valve 70 as pressure adjusting valves housed in the valve chamber 23; cam mechanism provided between the casing main body 20 and the filler neck FN; and a gasket GS mounted around the upper part of the casing main body 20 to seal the space between the filler neck.

Figure 2:
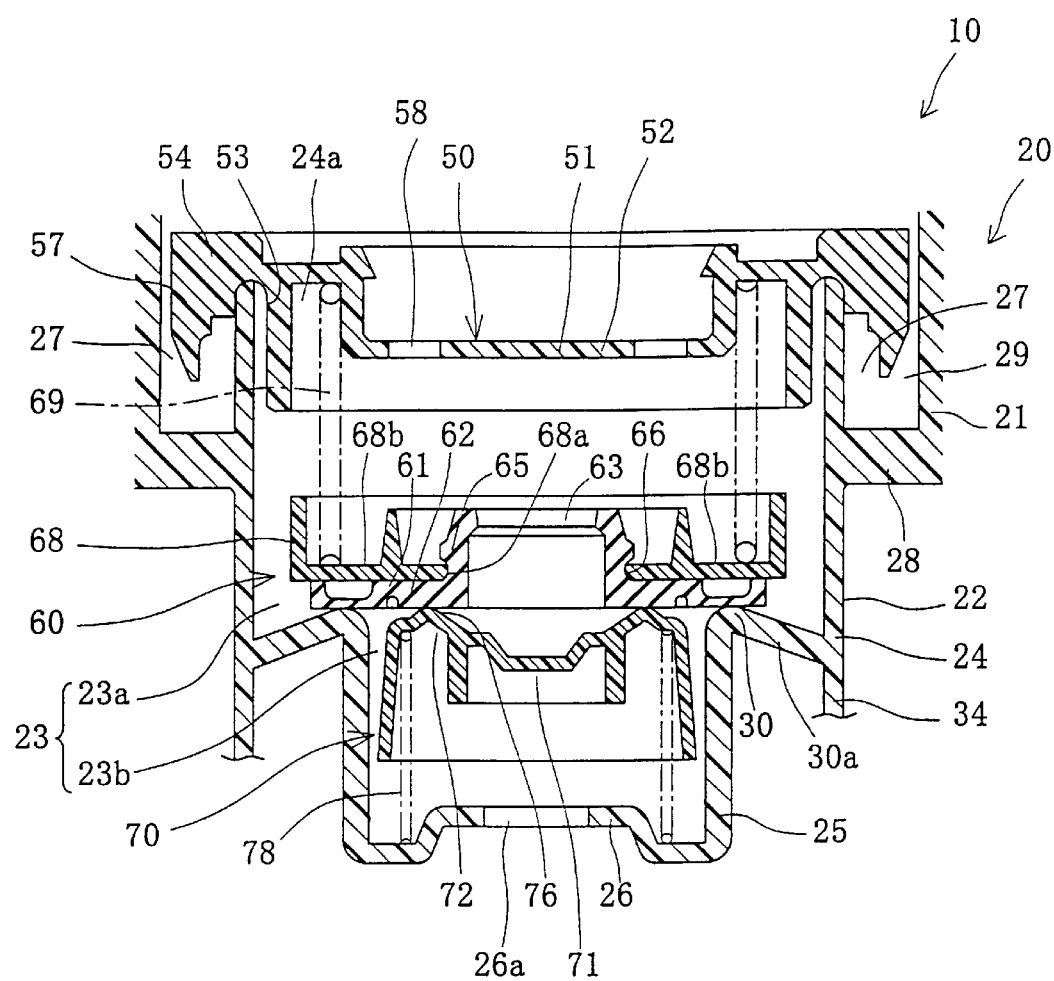
FIG. 2 is a cross section depicting an enlargement of the periphery of the positive pressure valve and negative pressure valve in the fuel cap.

The structures of the parts of the fuel cap 10 in the embodiment are described in further detail below. FIG. 2 is a cross section illustrating an enlargement of the periphery of the positive pressure valve 60 and negative pressure valve 70 in the fuel cap 10. In FIG. 2, the casing main body 20 is equipped with a virtually cylindrical external pipe 21, and a valve chamber-forming element 22 located on the inside of the external pipe 21. The valve chamber-forming element 22 is equipped with a valve chamber 23. The positive pressure valve 60 and negative pressure valve 70 are housed in the valve chamber 23.

The external pipe 21 and valve chamber-forming element 22 are unitarily connected with a horizontal connector 28 and vertical connector 29. The horizontal connector 28 is provided in the form of a disk from about the middle of the valve chamber-forming element 22 to the outer peripheral side to close off the fuel tank side against the outside air side, with the interval between the external pipe 21 and the valve chamber-forming element 22 serving as a hollow component 27. The vertical connector 29 connects the external pipe 21 and the valve chamber-forming element 22, and acts as a vertically disposed vertical wall to form a hollow component 27 along with the horizontal connector 28. Four are located equidistantly in the radial direction. A downward extension 34 (see FIG. 1) is provided on the bottom end of the valve chamber-forming element 22 to support the cam mechanism described below.

The valve chamber-forming element 22 comprises an upper side wall 24, a lower side wall 25 with a smaller diameter than the upper side wall 24, and a bottom 26 formed at the bottom of the lower side wall 25, all these components being unitarily formed to form a valve chamber 23. The valve chamber 23 comprises an upper chamber 23a housing the positive pressure valve 60, and a lower chamber 23b housing the negative pressure valve 70. The upper part of the valve chamber-forming element 22 serves as an opening 24a, this opening 24a being covered by an inner lid 50. A sloped surface 30a is formed between the upper side wall 24 and lower side wall 25, and a seat 30 is formed at the tip of the sloped surface 30a. The seat 30 is where the valve element 61 of the positive pressure valve 60 is detachable.

The inner lid 50 is ultrasonically welded to the periphery of the opening 24a of the valve chamber-forming element 22, thereby covering the opening 24a. The inner lid 50 comprises a center depression 52 in the center of the inner lid main body 51. A cylindrical support 53 protrudes along the outer periphery of the center depression 52. The cylindrical support 53 is formed in the shape of a cylinder that may be inserted into the opening 24a of the valve chamber-forming element 22. The outer periphery of the inner lid main body 51 serves as an outer disk 54. Positioning ribs 55 are formed in four equidistant locations around the outer periphery of the outer disk 54. The positioning ribs 55 protrude downward so as to be insertable into the hollow component 27. Passage holes 58 are opened in the inner lid 50, connecting the valve chamber 23 and exterior.

The positive pressure valve 60 and negative pressure valve 70 housed in the valve chamber 23 are described below. The positive pressure valve 60 comprises an opening and closing valve element 61 of a fluororubber or the like, a valve retaining member 68, and a coil spring 69. The valve element 61 is a disk with a seat surface 62 on the bottom surface. A fitting component 65 with a valve passage hole 63 is formed in the center. A side support recess 66 is formed in the side of the fitting component 65. The valve element 61 is attached to the valve retaining member 68 by being fitted into the fitting hole 68a of the valve retaining member 68. A spring support 68b is formed on the upper surface of the valve retaining member 68. The spring support 68b supports one end of the coil spring 69, and the other end is supported at the bottom surface of the inner lid 50, so that the coil spring 69 is supported between it and the inner lid 50.

The pressure in the fuel tank is adjusted by the positive pressure valve 60 by the following operations. When a certain pressure is exceeded as the tank pressure increases while the fuel cap 10 is fitted to the filler neck FN (see FIG. 1), the valve element 61 and valve retaining member 68 rise up against the urging force of the coil spring 69, allowing the interior of the fuel tank to communicate with the outside air via the interior of the valve chamber 23. When the interior of the fuel tank falls below a certain pressure in this state, the urging force of the coil spring 69 causes the valve element 61 to drop down, closing the valve. The valve element 61 thus opens and closes according to the pressure differential exerted on the valve element 61.

The negative pressure valve 70, on the other hand, comprises a valve element 71 made of resin, a spring support step 72 on the valve element 71, and a coil spring 78 urged against the valve element 71 across the space between the spring support step 72 and bottom 26.

The pressure in the fuel tank is adjusted by the negative pressure valve 70 by the following operations. When the pressure differential exerted on the valve element 71 reaches a certain level as the pressure in the interior of the fuel tank becomes negative relative to atmospheric pressure, then the valve element 71 moves down against the urging force of the coil spring 78, and the valve element 71 separates from the seat surface 62 of the valve element 61. At this time, the valve element 61 is seated on the seat 30, and a passage is formed between the valve element 71 and valve element 61 to maintain that state. This allows the fuel tank to communicate with the outside air to release the negative pressure in the fuel tank through the passage between the valve element 71 and the lower side wall 25, and the passage hole 26a in the bottom 26. When the pressure differential exerted on the valve element 71 falls below the urging force of the coil spring 78, the valve element 71 is closed.

When the differential pressure exerted on the valve element 61 of the positive pressure valve 60 passes a certain level as the tank pressure increases, the valve element 61 moves up against the urging force of the coil spring 69, causing the positive pressure valve 60 to open. On the other hand, when the differential pressure acting on the valve element 71 of the negative pressure valve 70 passes a certain pressure as the tank pressure drops, the valve element 71 moves down, causing the negative pressure valve 70 to open. That is, the tank pressure of the fuel tank becomes either positive or negative relative to atmospheric pressure, and when a certain level is exceeded, the positive pressure valve 60 or negative pressure valve 70 opens to allow the pressure to be adjusted to within a prescribed range relative to the outside air.

In FIG. 1, a gasket GS is furnished at the bottom surface of a flange 22a at the top of the casing main body 20. The gasket GS is interposed between the seal retainer 21a of the flange 22a and the inlet FNb of the filler neck FN, acting as a seal therebetween.

The lid 40 is attached to the casing main body 20, and comprises an upper plate 41 and side wall 42, being formed in the shape of a cap surrounded by the upper plate 41 and side wall 42. An engagement step 42a for attachment to the casing main body 20 upon engagement with the upper engagement 22b of the flange 22a of the casing main body 20 is formed on the inside of the side wall 42. This structure allows the lid 40 to be attached to the top of the casing main body 20 via the upper engagement 22b of the flange 22a and engagement step 42a. A handle 43 for opening and closing the fuel cap 10 is provided at the top of the upper plate 41.

Figure 3:
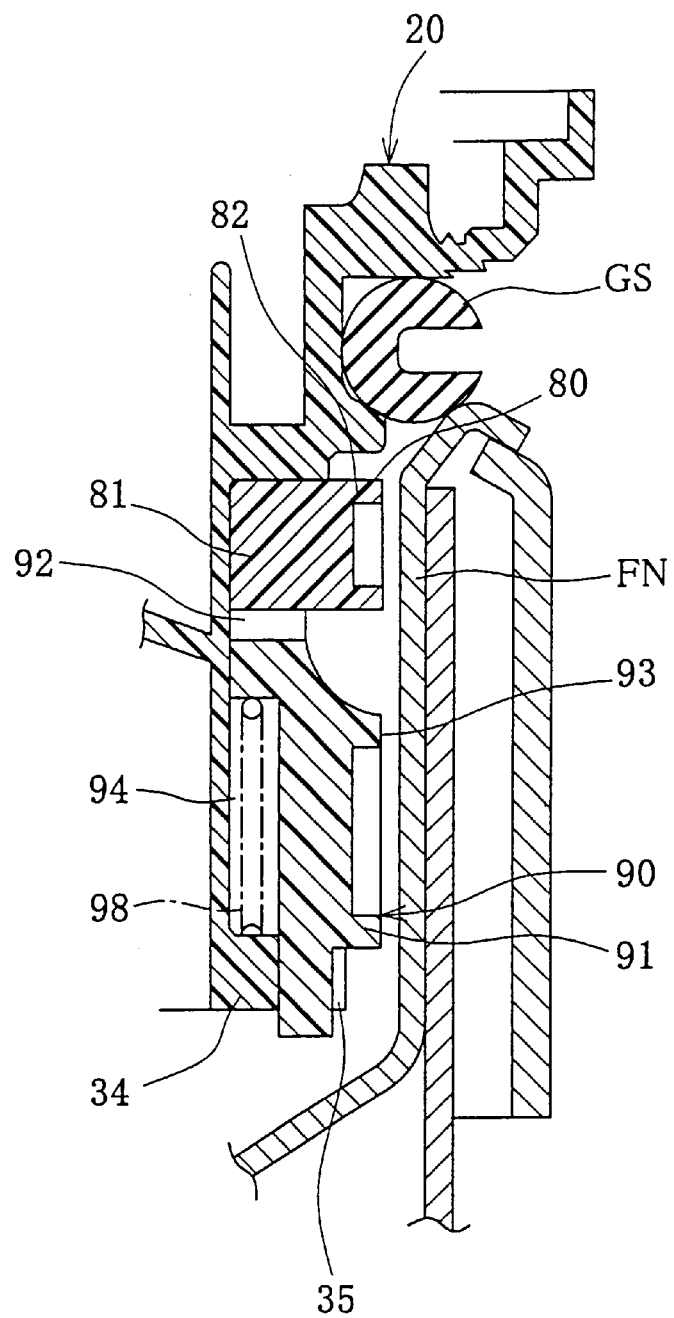
FIG. 3 is a cross section depicting the periphery of the cam mechanism in the fuel cap.
Figure 4:
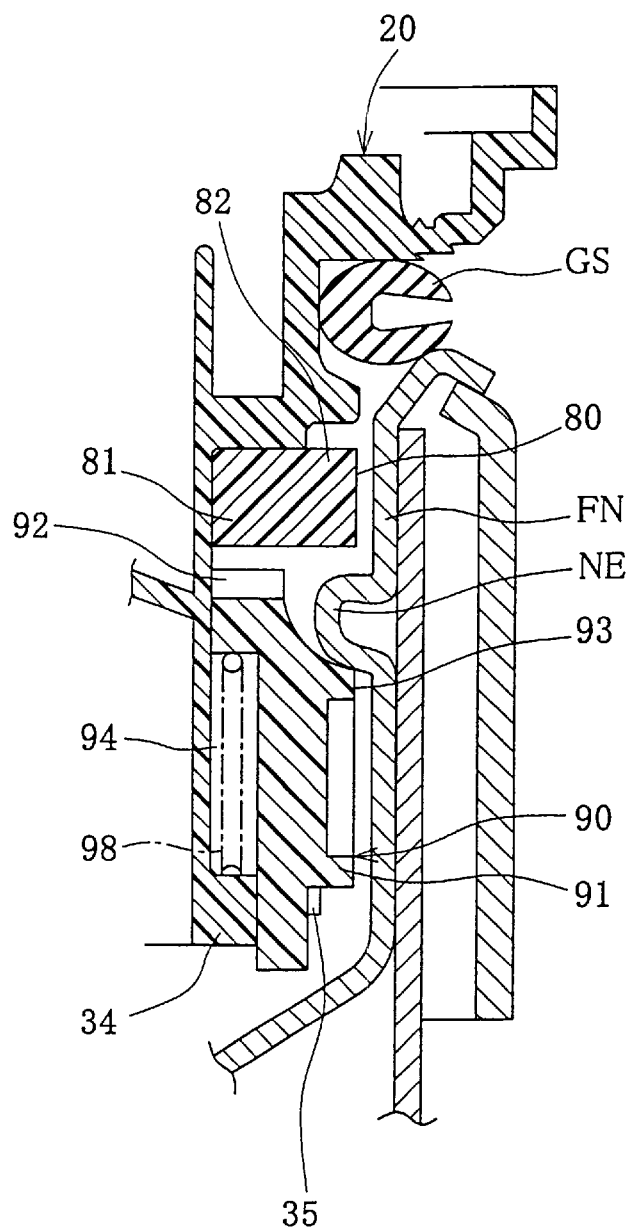
FIG. 4 is a cross section depicting the gasket disposed in a sealed state by the cam mechanism.
Figure 5:
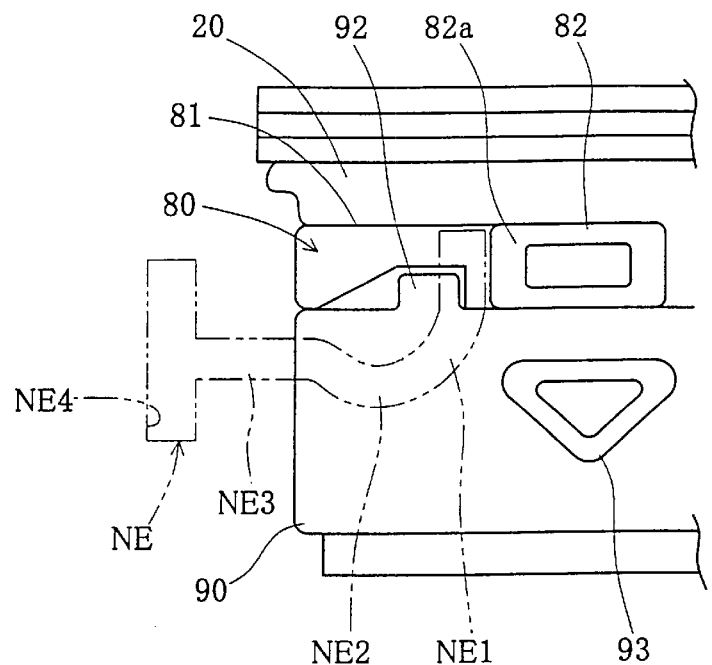
FIG. 5 is an illustration of the periphery of the cam mechanism.

FIGS. 3 and 4 are enlargements of the periphery of the cam mechanism provided on the side of the casing main body 20. FIG. 3 is before the seal is created, and FIG. 4 is with the seal in place. FIG. 5 is a side view of the periphery of the cam mechanism. In FIGS. 3 through 5, the cam mechanism primarily comprises a lower cam ring 90 and upper cam ring 80 fitted to the outside of the side wall of the casing main body 20, and a neck engagement threading NE (FIG. 4) formed on the inner wall of the filler neck FN. A spring 98 is suspended between the casing main body 20 and lower cam ring 90.

Figure 6:
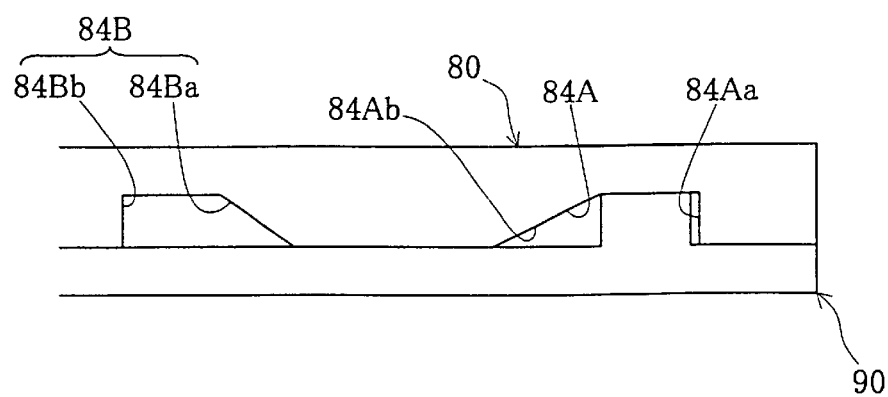
FIG. 6 illustrates further the relationship between the upper cam ring and the lower cam ring.

As illustrated in FIG. 5, the upper cam ring 80 comprises a cylindrical upper ring main body 81 rotatably furnished on the outer peripheral wall of the casing main body 20. A rectangularly projecting engagement protrusion 82 is formed on the outer peripheral surface of the upper ring main body 81. The side end serves as a detent end 82a for stopping the rotation of the upper cam ring 80. FIG. 6 illustrates further the relationship between the upper cam ring 80 and the lower cam ring 90. A first cam groove 84A and second cam groove 84B are formed along the lower edge of the upper cam ring 80. The first cam groove 84A comprises a vertically notched vertical surface 84Aa and a sloped surface 84Ab connected at a downward slope from the upper end of the vertical surface 84Aa. A sloped surface 84Ba and vertical surface 84Bb are also formed in the second cam groove 84B.

In FIG. 3, the lower cam ring 90 comprises a ring main body 91, and is supported by the downward extension 34 of the bottom of the casing main body. That is, a support end 35 is formed at the bottom end of the downward extension 34. The support end 35 is attached in such a way as to allow the cam ring 90 to move up and down, but to regulate its rotation. A cam protrusion 92 (FIG. 5) projects from the upper end of the lower cam ring 90. The cam protrusion 92 is formed so as to follow the first cam groove 84A. A cam protrusion base 93 (FIG. 5) follows the neck engagement threading NE and projects in triangular form on the outer wall of the lower cam ring 90.

A spring 98 is housed in the space between the downward extension 34 and the inner wall of the lower cam ring 90. The spring 98 is suspended between the top end of the housing recess 94 of the lower cam ring 90 and the support end 35.

As illustrated in FIG. 5, the neck engagement threading NE protrudes on the inner wall of the filler neck FN in such a way as to guide the cam protrusion base 93. The neck engagement threading NE undulates along the periphery and inside, forming a curve in the vertical direction. That is, the filler neck FN comprises a vertically formed guiding wall NE1, valley-shaped guide slope wall NE2, horizontally formed detent wall NE3, and vertically formed stop wall NE4. The neck engagement threading NE is formed in such a way that the cam protrusion base 93 follows along the bottom edge as the lower cam ring 90 moves.

Figure 7:
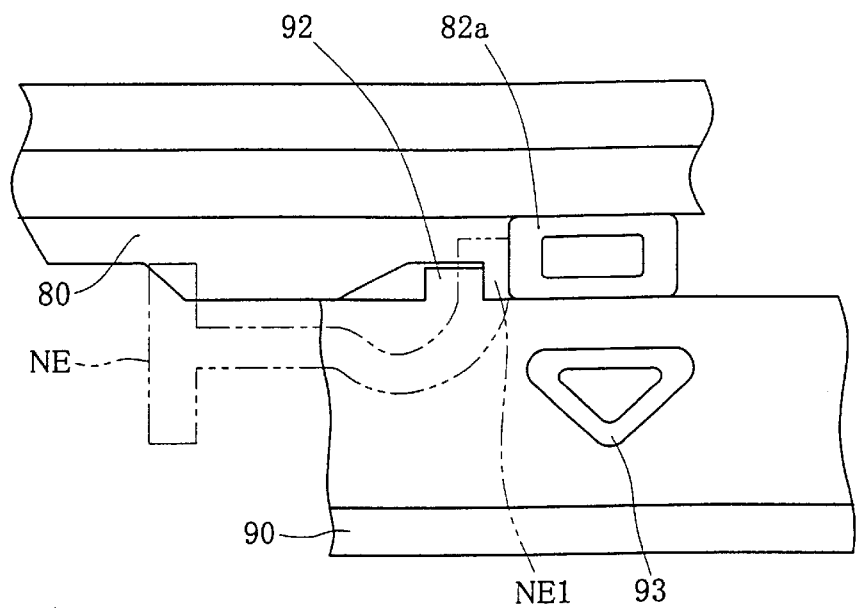
FIG. 7 is an illustration of the operation of the cam mechanism.
Figure 8:
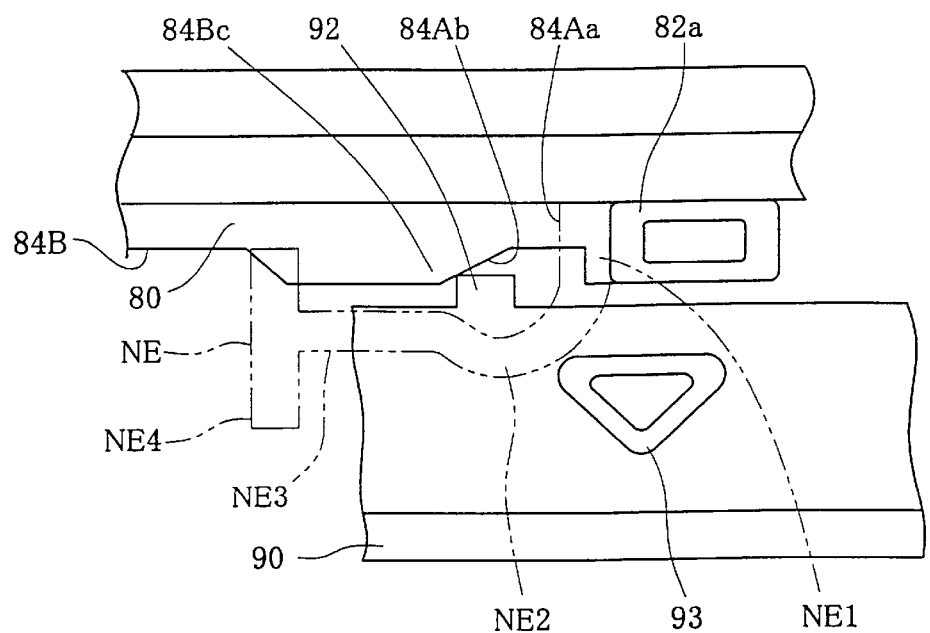
FIG. 8 is an illustration of the operations subsequent to those in FIG. 7.
Figure 9:
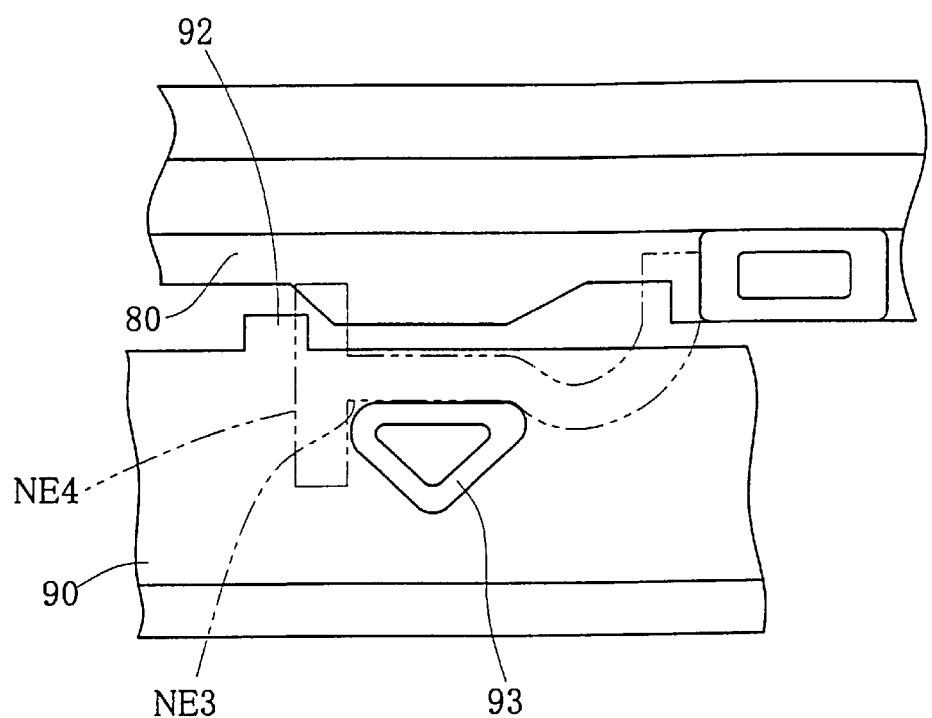
FIG. 9 is an illustration of the operations subsequent to those in FIG. 8.

The opening and closing of the fuel cap 10 and the accompanying sealing action of the gasket GS are described below. As illustrated in FIG. 1, when the casing main body 20 is manually inserted through the inlet FNb of the filler neck by the handle 43 of the lid 40, the casing main body 20 is inserted to the location shown in FIG. 3. FIG. 7 illustrates the positional relationship of the cam mechanism at this time. When the lid 40 is rotated clockwise by the handle 43, then the casing main body 20, the lower cam ring 90, and the spring 98 are unitarily rotated with the lid 40 relative to the filler neck FN. As the lid 40 turns, the upper cam ring 80 and the lower cam ring 90 end up as illustrated in FIG. 9 by way of FIG. 8.

That is, when the upper cam ring 80 comes into contact with the guiding wall NE1, its rotation is stopped, but the casing main body 20, lower cam ring 90, and gasket GS continue to rotate. When the lower cam ring 90 continues to rotate, the cam protrusion 92 follows the sloped surface 84Ab of the upper cam ring 80, as shown in FIG. 8, and rides up over the apex 84Bc. When the cam protrusion 92 rides up over the apex 84Bc, the cam protrusion 92 protrudes into the second cam groove 84B. In this case, the second cam groove 84B is separated from the cam protrusion 92, and the part guiding the lower cam ring 90 moves from the upper cam ring 80 to the neck engagement threading NE. That is, the cam protrusion base 93 follows the neck engagement threading NE. The cam protrusion base 93 rides up over the guide slope wall NE and comes into contact with the stop wall NE4, thereby regulating the rotation of the lower cam ring 90. In this state, the detent wall NE3 positions the cam protrusion base 93.

The lower cam ring 90 is guided by the neck engagement threading NE, and is thus moved downward. As shown in FIG. 4, this causes the spring 98 to press downward, as shown in FIG. 4, so that the casing main body 20 is moved downward by the urging force of the spring 98. This in turn causes the gasket to press against the inside wall of the filler neck FN, sealing the space, so that the interior of the filler neck FN is shielded from the outside.

Operations the reverse of the closing operations described above are undertaken (FIG. 9 to FIG. 8 to FIG. 7) to remove the fuel cap 10 from the filler neck FN from the state illustrated in FIG. 4. That is, when the lid 40 is rotated counterclockwise, the casing main body 20, spring 98, and lower cam ring 90 also move counterclockwise with the lid 40. In this state, the upper cam ring 80 is separate from the lower cam ring 90 and thus is not subject to the rotating force from the casing main body 20 or lower cam ring 90, allowing it to be kept in a stopped state. When the cam protrusion base 93 rides up over the guide slope wall NE2 along with the rotation of the lower camp ring 90 rotating with the casing main body 20, the cam protrusion 92 also rides up over the apex 84Bc. As a result, the lower cam ring 90 is guided from the neck engagement threading NE to the upper cam ring 80, so that the cam protrusion 92 moves along the sloped surface 84Ab up to the vertical surface 84Aa after riding up over the apex 84Bc. When the lower cam ring 90 thus moves upward, the urging force of the casing main body 20 by the spring 98 is weakened, so the casing main body 20 moves upward. Due to the movement of the casing main body 20, the sealing force of the gasket GS is weakened. In this state, the fuel cap 10 is extracted from the filler neck FN.

At this point, the lid 40 is drawn in the axial direction so that the casing main body 20 is removed from the inlet pipe IP, opening the inlet FN. When a fuel gun (not shown) is inserted into the inlet FNb, the fuel may be fed from the fuel gun through the fuel passage IPa into the fuel tank.

The fueling mechanism of the fuel cap 10 affords the following action and effects.

1) When the fuel cap 10 is rotated during fueling to close the inlet FNb, the rotating force of the casing main body 20 is converted by the cam mechanism to force in the axial direction, and the gasket GS is firmly pressed against the seat surface by the force of the spring 98 to create a seal, thus providing good sealing properties between the interior of the fuel tank and the outside. The gasket GS is also subject to uniform compression force in the vertical direction by the cam mechanism, and since the space subject to torsion force is shorter than in the past, more uniform sealing force may be obtained. Since the GS gasket is pressed by the force of the spring 98, the urging force is virtually constant, despite differences in the rotation force, with no over-tightening.

2) When the fuel cap 10 is closed, the gasket GS is pressed to the seat surface by the urging force of the spring 98 to create a seal. That is, the space subject to major torque is reduced, affording better durability.

3) When the fuel cap 10 is opened and closed, the fuel cap 10 is subject only to pressing force, with no significant sliding resistance from the gasket GS. Less rotating torque is thus needed to operate the fuel cap 10, affording better manipulation.

4) Since the gasket GS can give better sealing force when compressed by the spring 98, the gasket GS can thus be designed with a greater degree of freedom in terms of material, surface treatment (state) and shape in order to produce better sealing properties than gaskets which are subject to friction force and torque as in the prior art.

5) The gasket GS is provided on the inlet FNb upstream from the cam mechanism, so that no separate sealing component need be provided in locations where the cam mechanism slides, thus affording a simpler structure.

Figure 10:
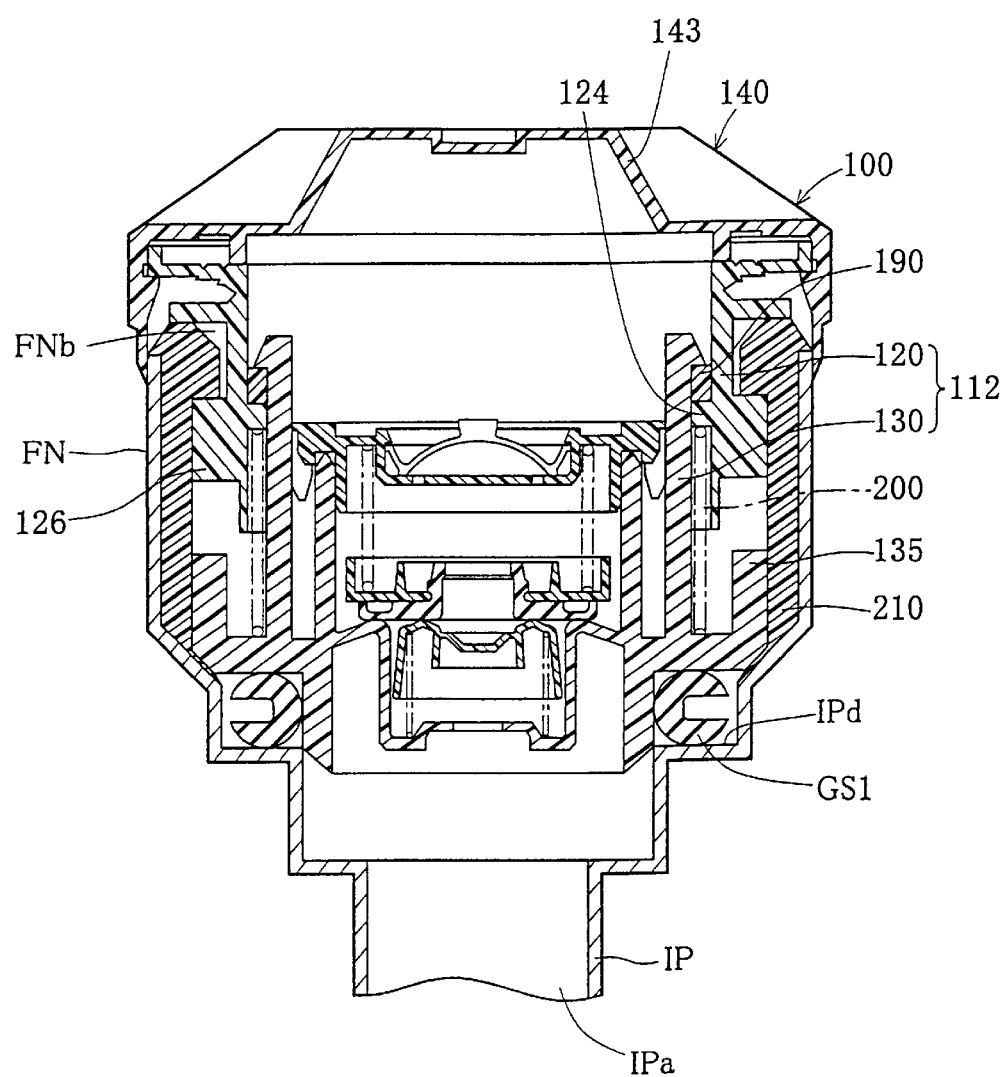
FIG. 10 is a cross section of the fueling mechanism in a second embodiment.

A fueling mechanism comprising a fuel cap 100 in a second embodiment is described below. FIGS. 10, 11A and 11B illustrate a fuel mechanism comprising such a fuel cap 100 in the second embodiment. FIG. 10 illustrates a state closed by the fuel cap 100, and FIGS. 11A–11B illustrate a state with the fuel cap 100 removed. In FIGS. 10 and 11B, the inlet FNb of the fueling mechanism is opened and closed by attaching and detaching the fuel cap 100 to and from the guide 210 held in the filler neck FN. The structure of the casing main body 112 is characterized in that the fuel cap 100 is divided into two parts: a rotating casing 120 and a sliding casing 130. The rotating casing 120 is rotated with the lid 140 to move the sliding casing 130 up and down, creating a seal with the gasket GS1.

The structures of the various parts of the fueling mechanism are described below. As shown in FIG. 11B the inlet pipe IP has a filler neck FN at the top, and is connected to the tank main body (not shown) through the fuel passage IPa from the filler neck FN. A seat surface IPd is formed in the shape of a ring at the bottom step of the filler neck FN. The seat surface IPd is sealed by the gasket GS1 of the fuel cap 100. A guide 210 detachably attaching the fuel cap 100 is held in the filler neck FN.

Figure 11:
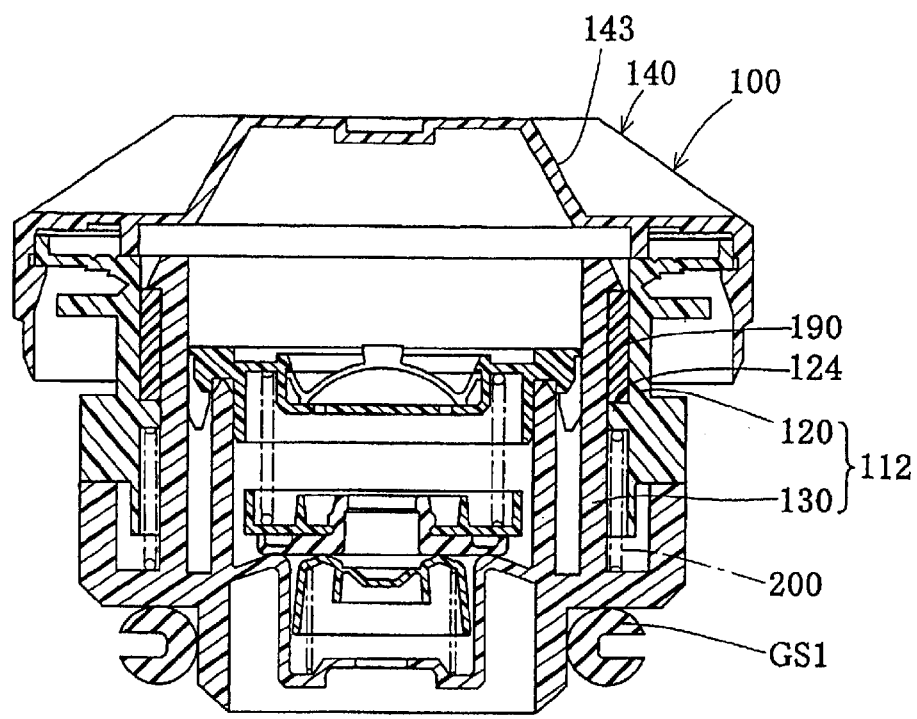
FIGS. 11A–11B are cross sections of the filler neck and the fuel cap while the fuel cap is removed.
Figure 11:
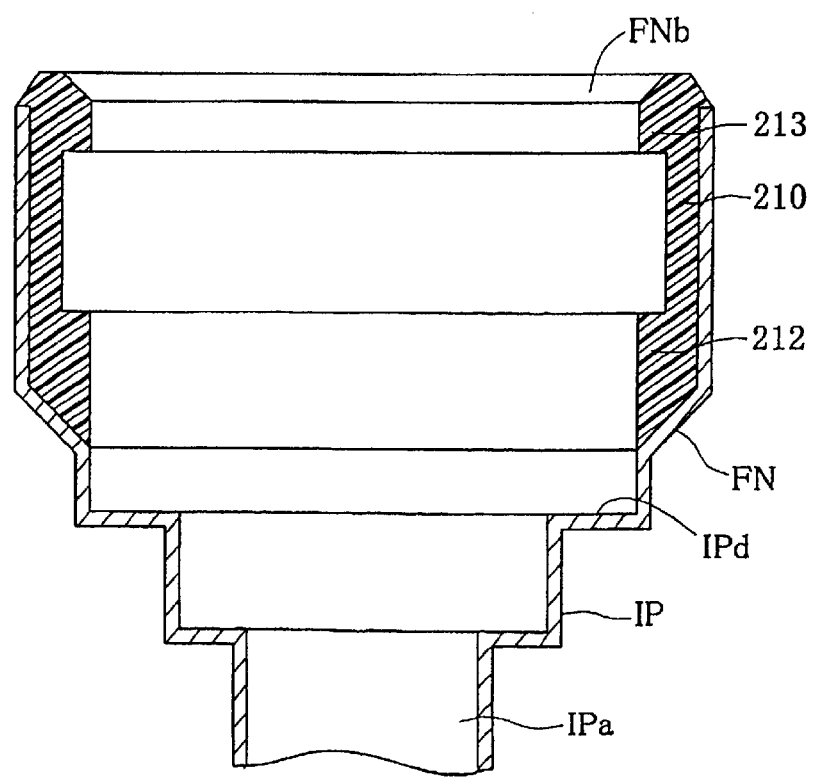
Figure 12:
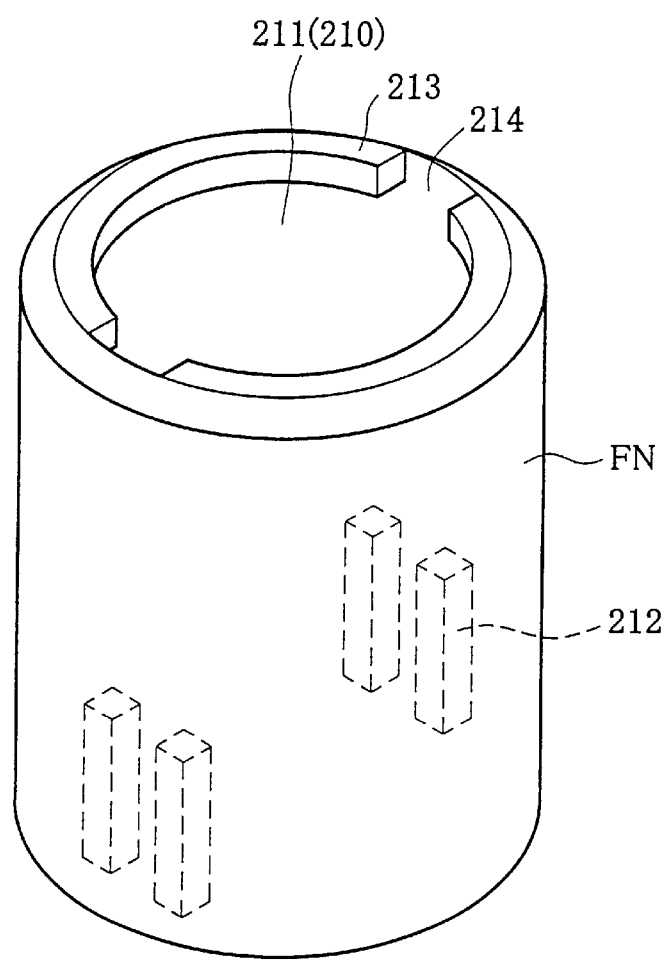
FIG. 12 is an oblique view of the periphery of the guide and filler neck.

FIG. 12 is an oblique view of the periphery of the guide 210 and filler neck FN. As shown in FIG. 12, the guide 210 comprises a pipe main body made of a resin cylinder. Rotation detents 212 for regulating the rotating of the sliding casing 130 (FIG. 11A) are formed in four locations on the inner wall of the pipe main body 211. A ring-shaped detent 213 extending in the form of a ring is formed at the opening of the pipe main body 211, and insertion notches 214 for the insertion of the casing are formed in a portion of the ring-shaped detent 213.

Figure 13:
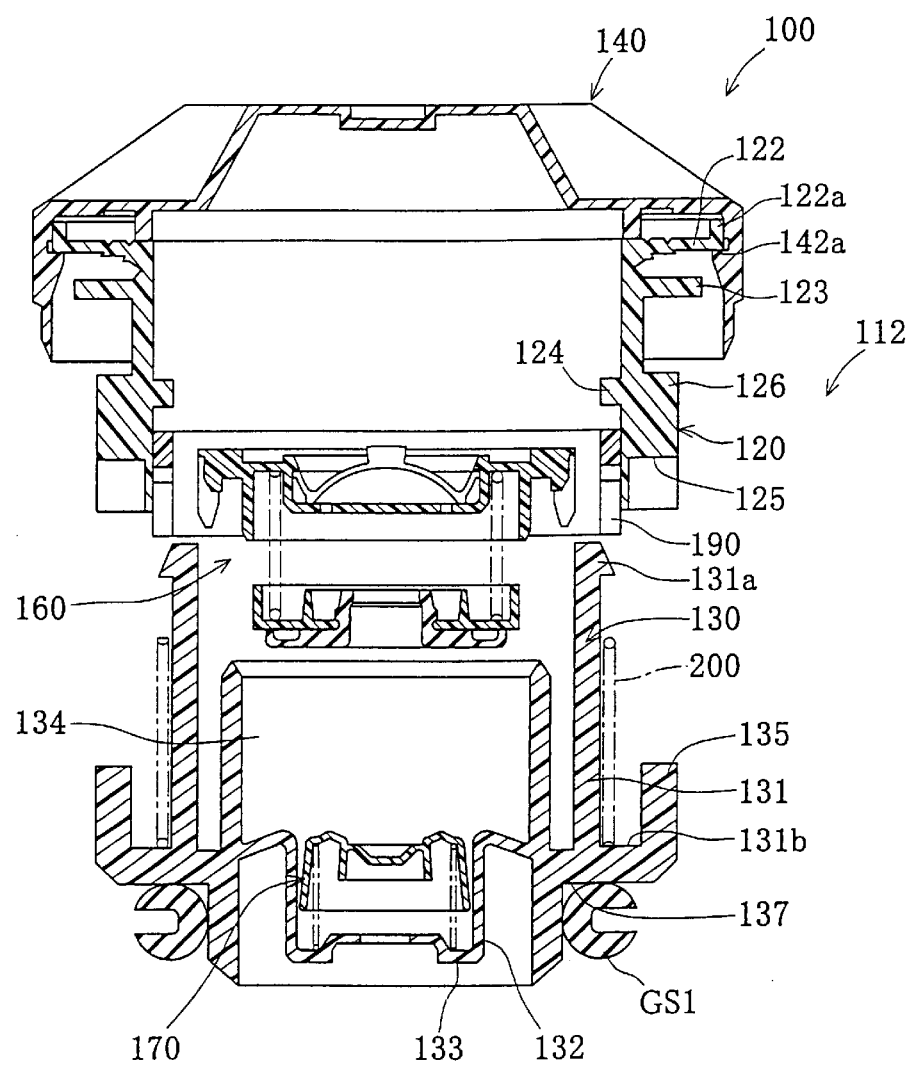
FIG. 13 is an exploded cross section of the fuel cap.

FIG. 13 is an exploded cross section of the fuel cap 100. The fuel cap 100 comprises a casing main body 112, lid 140, cam ring 190, and spring 200 as primary components. The casing main body 112 comprises a rotating casing 120 and sliding casing 130. When the rotating casing 120 is rotated, the sliding casing 130 slides up and down. The rotating casing 120 is cylindrical. The upper part is provided with a flange 122 having an engagement component 122a for holding the lid 140. The engagement component 122a engages with the engagement step 142a of the lid 140, so that the lid 140 is attached to the rotating casing 120. A top stopper 123 and support ends 126 protrude at the bottom of the flange 122. The top stopper 123 prevents the fuel cap 100 from falling into the filler neck FN. The support ends 126 are convexities for preventing the the rotating casing 120 from being pulled off the guide 210, from a state in which the fuel cap 100 is mounted on the guide 210, and are formed in two locations at the prescribed width in the peripheral direction. A cam protrusion 124 for supporting the upper end of the spring 200 and the bottom end of the cam ring 190 is provided on the inner periphery of the rotating casing 120.

The sliding casing 130 is disposed on the inner periphery of the rotating casing 120. A valve chamber 134 open at the top and surrounded by an outer cylinder 131, inner cylinder 132, and bottom wall 133 is formed. A positive pressure valve 160 and negative pressure valve 170 are housed in the valve chamber 134. The positive pressure valve 160 and negative pressure valve 170 are the same as in the first embodiment described above, and will not be further described. An upper engagement catch 131a extends upward at the top of the outer cylinder 131. The upper engagement catch 131a engages with the upper surface of the cam ring 190. Guide protrusions 135 protruding outwardly in the shape of an L are provided on the outer periphery of the sliding casing 130. The guide protrusions 135 protrude into the insertion recess 125 of the rotating casing 120 to allow the sliding casing 130 to be guided against the rotating casing 120. A spring detent end 131b is provided at the base of the guide protrusions 135. The spring detent end 131b suspends the spring 200 between it and the cam protrusion 124 of the rotating casing 120. The spring 200 urges in such a way as to press the sliding casing 130 down against the rotating casing 120, but since the upper engagement catch 131a is engaged via the cam ring 190 against the rotating casing 120, the sliding casing 130 is slidable while the spring 200 is urged against the rotating casing 120. A seal retainer 137 is also formed at the bottom surface of the guide protrusions 135 of the sliding casing 130, and the gasket GS1 is held by this seal retainer 137.

Figure 14A:
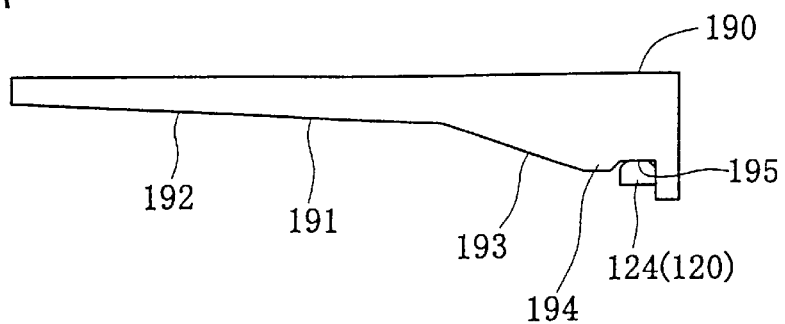
FIGS. 14A, 14B and 14C illustrate the deployment of the cam ring.
Figure 14B:
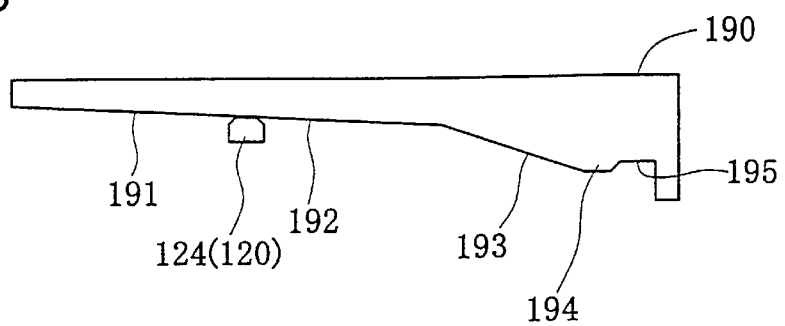
Figure 14C:
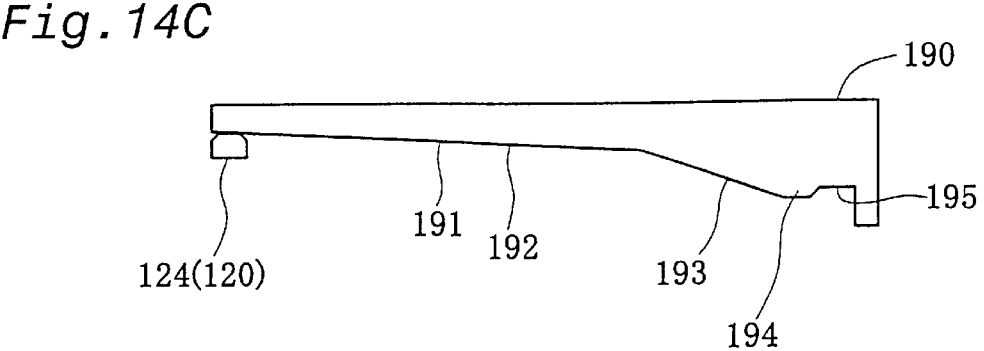

FIGS. 14A, 14B and 14C illustrate the deployment of the cam ring 190. In FIG. 14A, the cam ring 190 is a member that operates in such a way that the sliding casing 130 moves up and down as the rotating casing 120 rotates. The cam ring is a round ring of varying vertical thickness, the bottom surface of which serves as a cam surface 191. The cam surface 191 is the surface followed by the cam protrusion 124 of the rotating casing 120, and comprises a sloped surface 192 having a gentle sloped angle, and a steeply sloped surface 193 that has a steeper sloped angle and is connected to the gently sloped surface 192. A cam protrusion 194 is formed at the end of the steeply sloped surface 193. A cam recess 195 is formed at a location riding up over the cam protrusion 194. The cam recess 195 is a recess for positioning the cam protrusion 124.

The operations by which the fuel cap 100 opens and closes the inlet FNb and the accompanying sealing operations of the gasket GS1 are described below. While the fuel cap 100 is mounted at the filler neck FN as shown in FIG. 11, the cam protrusion 124 in FIG. 14A is located in the cam recess 195 where the cam ring 190 is thickest, so that the sliding casing 130 is in the highest location relative to the rotating casing 120.

Figure 15:
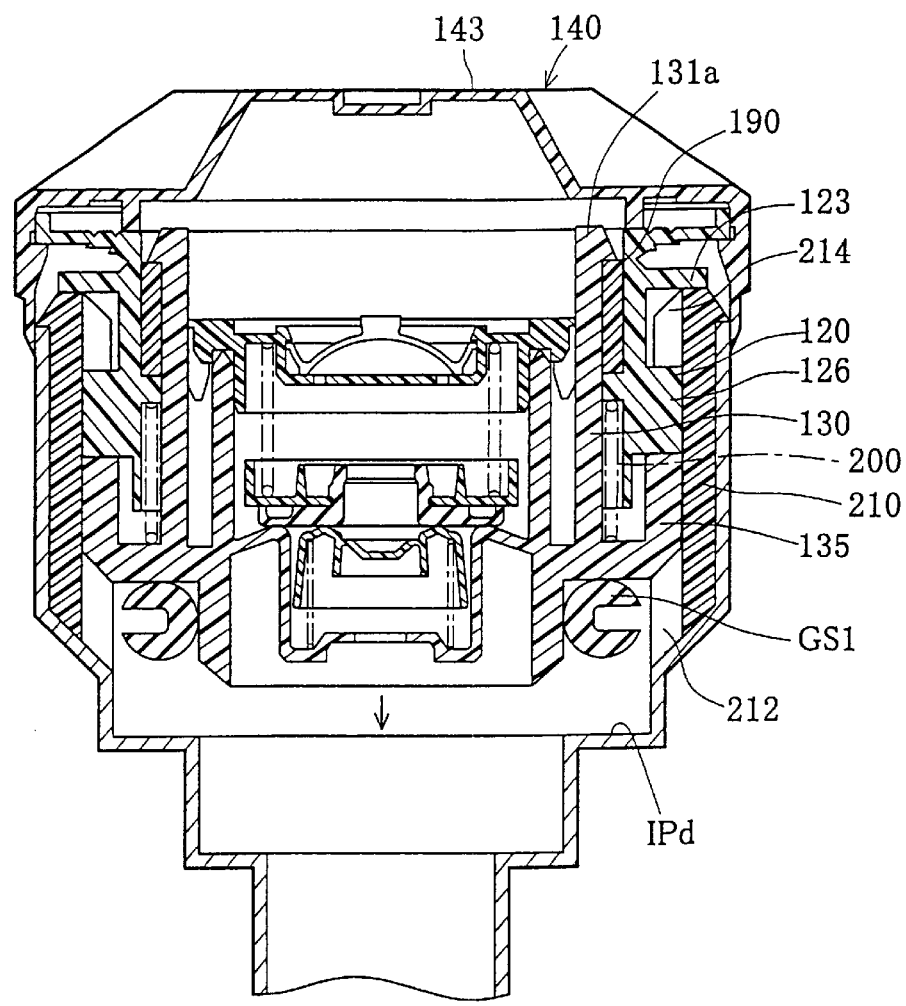
FIG. 15 is a cross section of the fuel cap immediately after being inserted into the filler neck.

As shown in FIG. 15, when the handle 143 of the lid 140 is taken in hand, and the support ends 126 of the rotating casing 120 are aligned with the insert notches 214 of the guide 210 (FIG. 12) to insert the casing main body 112 into the guide 210, it is inserted to the location shown in FIG. 15. In this state, the guide protrusions 135 of the sliding casing 130 are positioned by being brought into contact with the ring-shaped detent of the guide 210 as shown in FIG. 12, so the rotation of the sliding casing 130 is regulated relative to the guide 210.

When the lid 140 is then rotated clockwise, the rotating casing 120 rotates clockwise in a unitary manner with the lid 140, and the cam protrusion 124 rides up over the cam protrusion 194 of the cam ring 190 from the state shown in FIG. 14A and moves from the steeply sloped surface 193 along the gently sloped surface 192, as shown in FIG. 14B.

As shown in FIG. 15, the rotating casing 120 comes into contact with the ring-shaped detent 213 at the support ends, and is urged by the spring 200 so that its upward movement is regulated. The sliding casing 130 thus moves downward due to the spring force built up in the spring 200. That is, because of the shorter distance between the cam protrusion 124 and the upper engagement catch 131a on either side of the cam ring 190, the sliding casing 130 is moved downward by the spring 200. When the cam protrusion 124 moves to the left end in the Fig., as shown in FIG. 14C, the movement of the sliding casing 130 causes the gasket GS1 mounted on the seal retainer 137 to press onto the seat surface IPd, creating a seal there (state in FIG. 10).

The operation for removing the fuel cap 100 from the guide 210 is described next. When the lid 140 is rotated counterclockwise from the state in FIG. 10, the cam protrusion 124 moves from the state in FIG. 14C to that in FIG. 14A. That is, the cam protrusion 124 follows the gently sloped surface 192 and steeply sloped surface 193, rides up over the cam protrusion 194, and is positioned in the cam recess 195. Because of the greater axial thickness of the cam ring 190, the cam protrusion 124 at this time presses the spring detent end 131b against the urging force of the spring 200, causing the sliding casing 130 to move upward against the rotating casing 120. As a result, the gasket GS1 mounted on the bottom of the sliding casing 130 separates from the seat surface IPd. In this state, the support ends 126 of the rotating casing 120 are aligned with the insertion notches 214, and the fuel cap 100 is in position to be removed. The fuel cap 100 is moved upward to allow the fuel cap 100 to be taken off. This allows the fuel gun to be inserted into the inlet FNb for fueling.

The fueling mechanism equipped with the fuel cap 100 affords the following action and effects.

1) When the fuel cap 100 is rotated to close the inlet FNb, the rotation of the rotating casing 120 causes the sliding casing 130 to move downward, creating a seal with the gasket GS1, but the gasket GS1 is subject to uniform compression force in the upward direction by the spring 200 and is not subject to torsion as in the past, allowing more uniform sealing force to be obtained.

2) When the fuel cap 100 is closed, the gasket GS1 is pressed by the spring 200 to seal the seat surface IPd. In other words, it is subject only to uniform compression force, not to any significant torque, and results in better durability.

3) When the fuel cap 100 is opened and closed, it is subject only to pressing force, not significant sliding force from the gasket GS1, so less rotating torque is needed to operate the fuel cap 100, making it easier to operate.

4) The gasket GS1 is provided in the passage on the vehicle side from the cam mechanism, making it unnecessary to provide a separate sealing component in a location where the cam mechanism slides, so that the structure is simpler.

Figure 16:
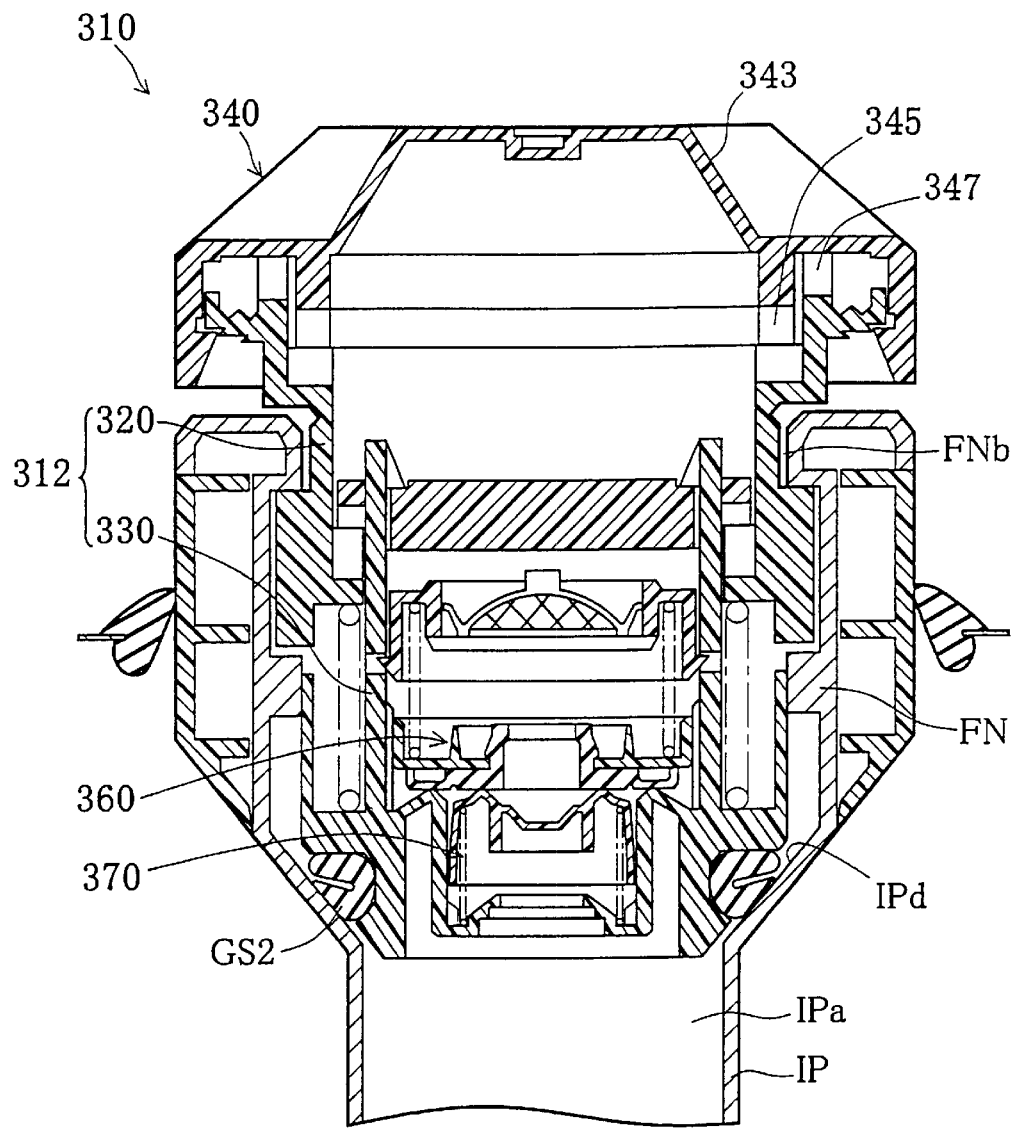
FIG. 16 is a cross section of the fuel cap mounted on the filler neck in an embodiment of the present invention.
Figure 17:
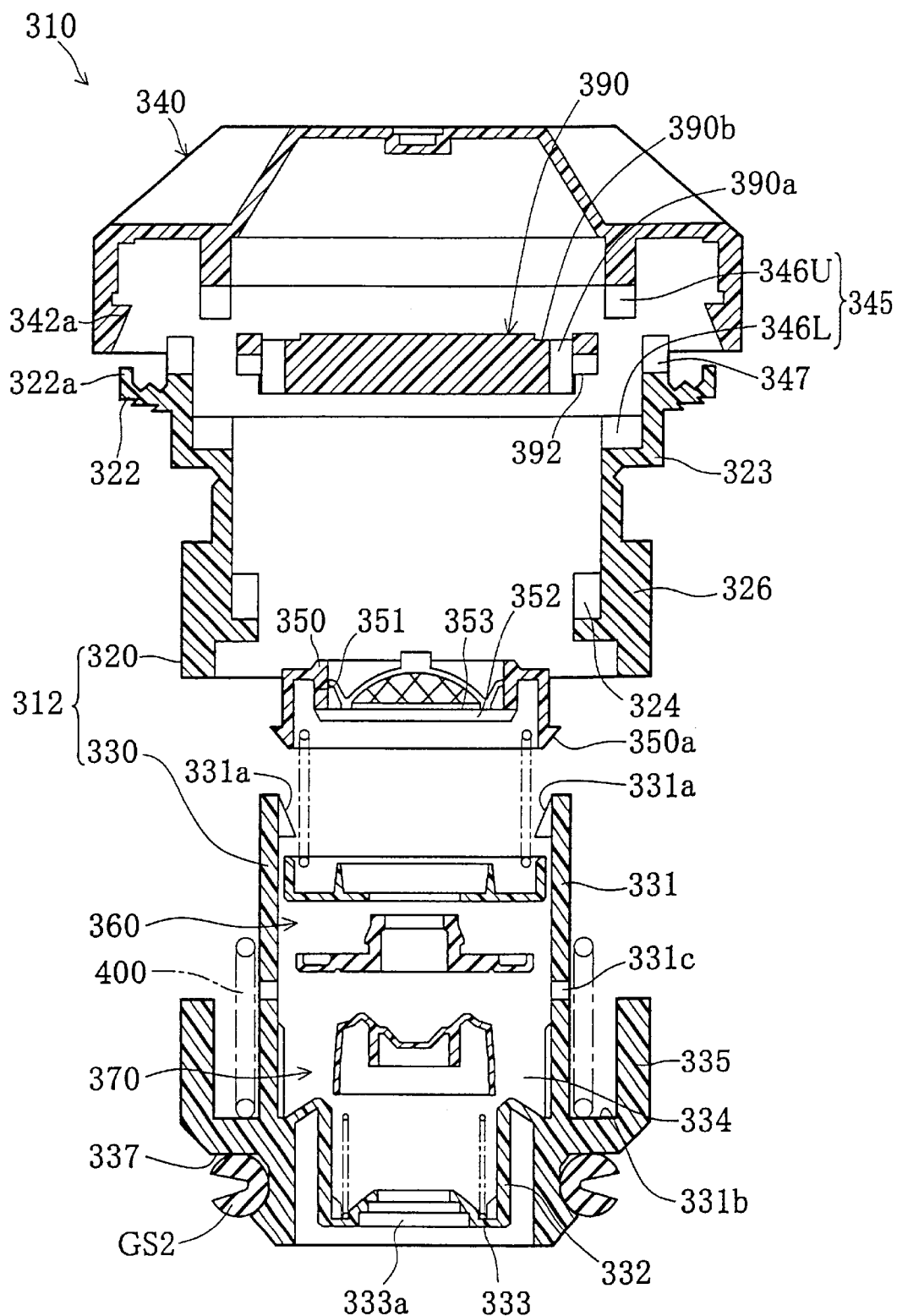
FIG. 17 is an exploded cross section of the fuel cap.

FIG. 16 is a cross section depicting a fuel cap 310 mounted on the filler neck FN in a third embodiment of the present invention, and FIG. 17 is an exploded cross section of the fuel cap 310. In FIGS. 16 and 17, the fueling mechanism comprises a fuel cap 310 that is detachable in the filler neck FN to open and close the inlet FNb. The casing 312 of the fuel cap 310 comprises two components: a rotating casing 320 and a sliding casing 330. The rotating casing 320 is rotated with the lid 340 to move the sliding casing 330 up and down, creating a seal with the gasket GS2.

The structures of the various parts of the fueling mechanism are described below. As shown in FIG. 16, the inlet pipe IP has a filler neck FN at the top, and is connected to the tank main body (not shown) through the fuel passage IPa from the filler neck FN. A seat surface IPd is formed in the shape of a ring at the bottom step of the filler neck FN. The seat surface IPd is sealed by the gasket GS2 of the fuel cap 310. Means for preventing the fuel cap 310 from being pulled off and for stopping its rotation are provided in the filler neck FN.

Figure 18:
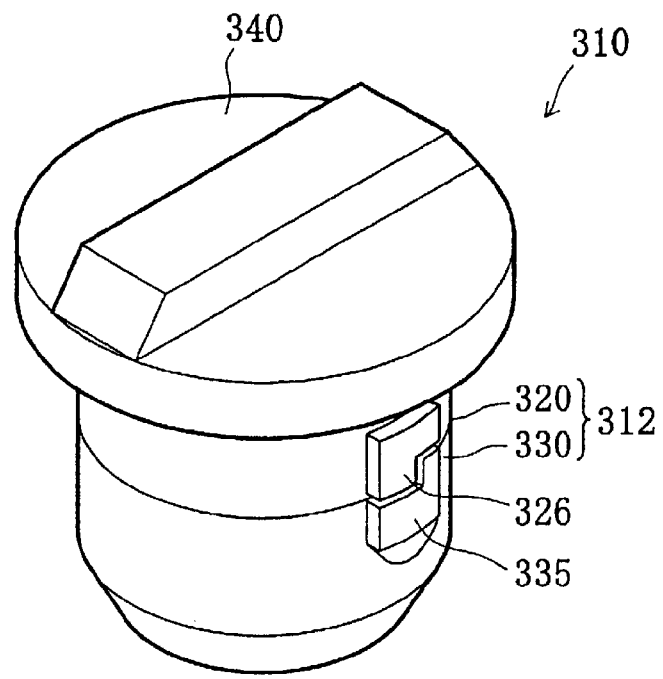
FIGS. 18A–18B are illustrations of the fuel cap and the neck side and that together show the engagement between the fuel cap and the neck side guides of the filler neck.
Figure 18:
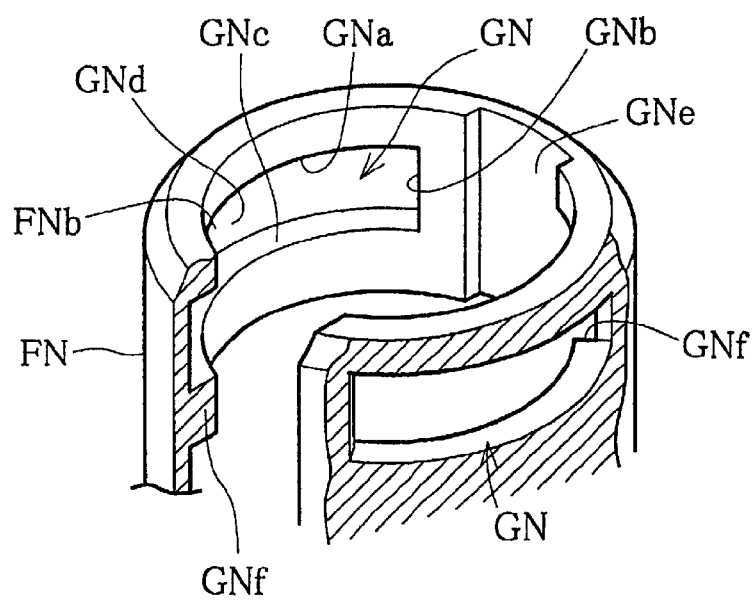

FIGS. 18A–18B are illustrations of the engagement between the fuel cap 310 and the means for preventing extraction and rotation in the filler neck FN. As shown in FIG. 18B, neck side guides GN and GN acting as means for preventing casing 312 from being pulled off or rotated are formed in two axially symmetrical locations on the inner wall of the filler neck FN. The neck side guide GN is enclosed, in the form of a square with one side missing, by a top stopper wall GNa, side wall GNb, and bottom wall GNc, the space therein acting as a guide groove GNd. Insert notches GNe and GNe that are open in the axial direction and that allow the insertion of the casing 312 are formed in the space between the neck side guides GN and Gn, which is the opening of the filler neck FN. A rotating detent GNf is also formed on the side of the bottom wall GNc.

Figure 27:
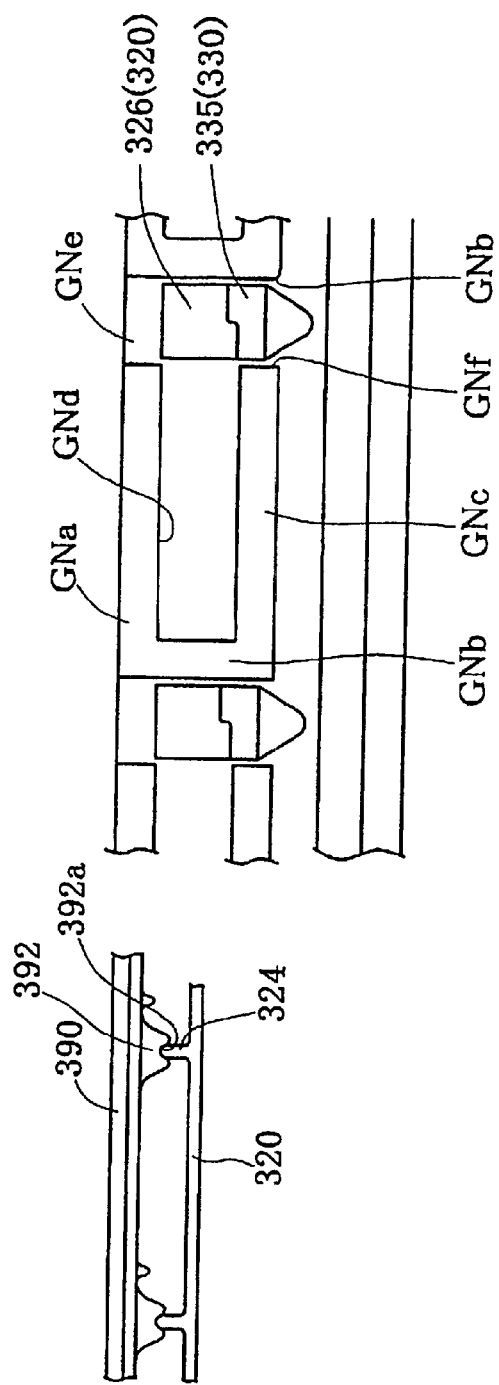
FIGS. 27A–27B are illustrations of the operations for opening and closing the fuel cap.
Figure 28:
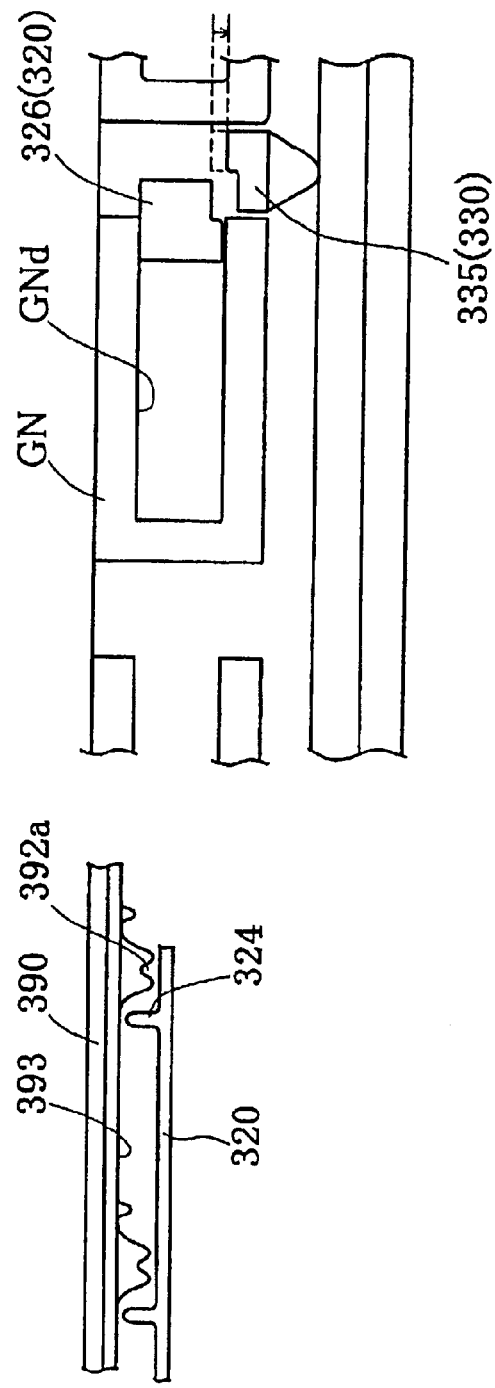
FIGS. 28A–28B are illustrations of the opening and closing operations subsequent to FIGS. 27A–27B.
Figure 29:
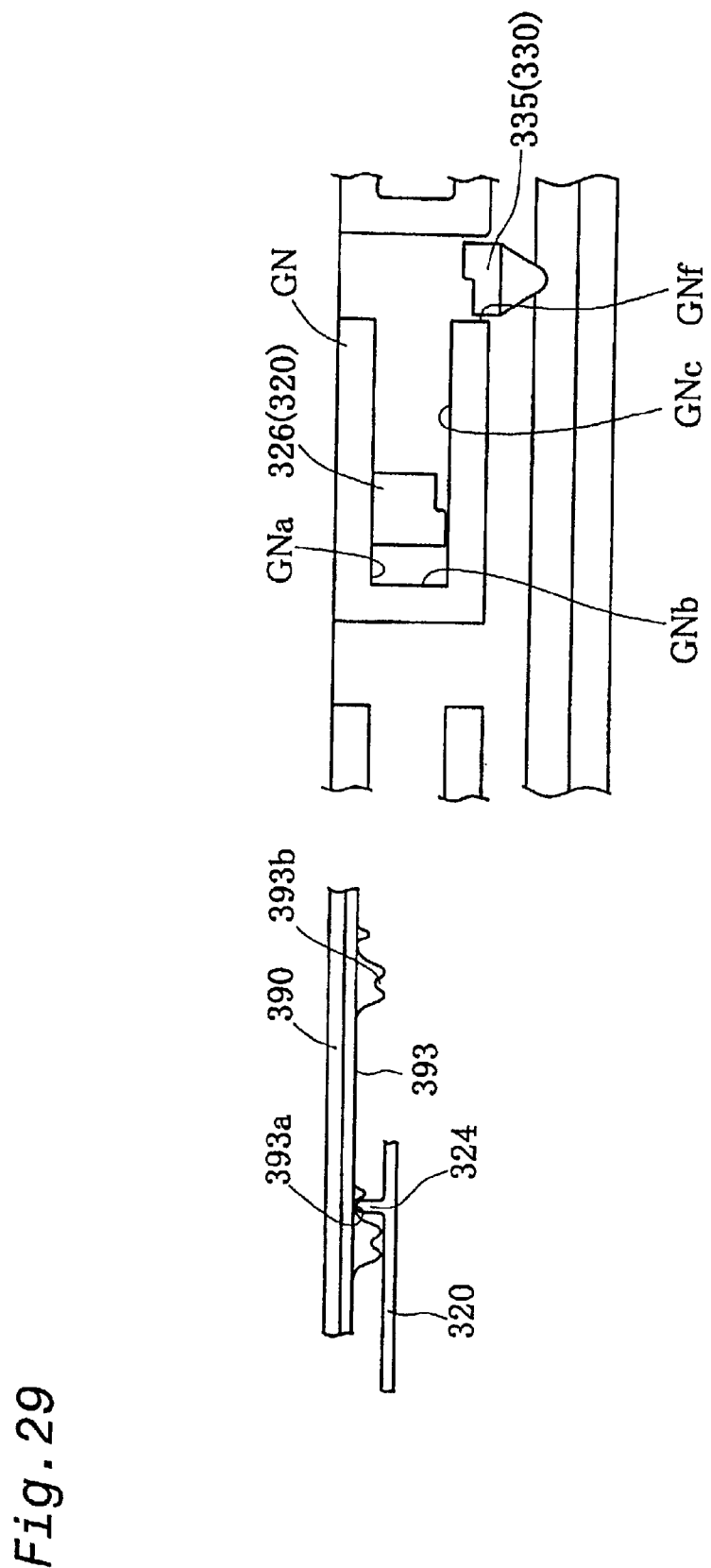
FIGS. 29A–29B are illustrations of the opening and closing operations subsequent to FIGS. 28A–28B.

Support ends 326 are formed on the outer periphery of the rotating casing 320, and guide protrusions 335 protrude on the outer periphery of the sliding casing 330. The support ends 326 and guide protrusions 335 are provided on opposite sides, pivoting on the casing 312. The support ends 326 and guide protrusions 335 may be inserted into the insert notches GNe of the neck side guides GN. The support ends 326 may be inserted into the guide groove GNd by rotating the rotating casing 320. The guide protrusions 335 come into contact with the rotating detent GNf (FIG. 27B) to stop the rotation.

In FIG. 17, the fuel cap 310 comprises a casing main body 312, lid 340, cam ring 390, and spring 400 as primary components. The casing main body 312 comprises a rotating casing 320 and sliding casing 330. When the rotating casing 320 is rotated, the sliding casing 330 slides up and down. The rotating casing 320 is cylindrical. The upper part is provided with a flange 322 having an engagement component 322a for holding the lid 340. The engagement component 322a engages with the engagement step 342a of the lid 340, so that the lid 340 is attached to the rotating casing 320.

The top stopper 323 and support ends 326 protrude at the bottom of the flange 322. The top stopper 323 prevents the fuel cap 310 from falling into the filler neck FN. The support ends 326 are convexities for preventing the the rotating casing 320 from being pulled off of the filler neck FN, from a state in which the fuel cap 310 is mounted on the filler neck FN, and are formed in two locations at the prescribed width in the peripheral direction. A cam protrusion 324 for supporting the upper end of the spring 400 and the bottom end of the cam ring 390 is provided on the inner periphery of the rotating casing 320.

The sliding casing 330 is disposed on the inner periphery of the rotating casing 320. A valve chamber 334 open at the top and surrounded by an outer cylinder 331, inner cylinder 332, and bottom wall 333 is formed. A positive pressure valve 360 and negative pressure valve 370 are housed in the valve chamber 334. The opening of the valve chamber 334 is covered by an inner lid 350. That is, the inner lid 350 has engagement catches 350a on the outer periphery. The engagement catches 350a engage with engagement holes 331c about midway in the outer cylinder 331 to cover the opening of the valve chamber 334. The inner lid 350 has a center recess 352 in the center of the inner lid main body 351. A filter 353 curved at the top is fitted in the center recess 352, allowing the valve chamber 334 to communicate with the outside.

Figure 19:
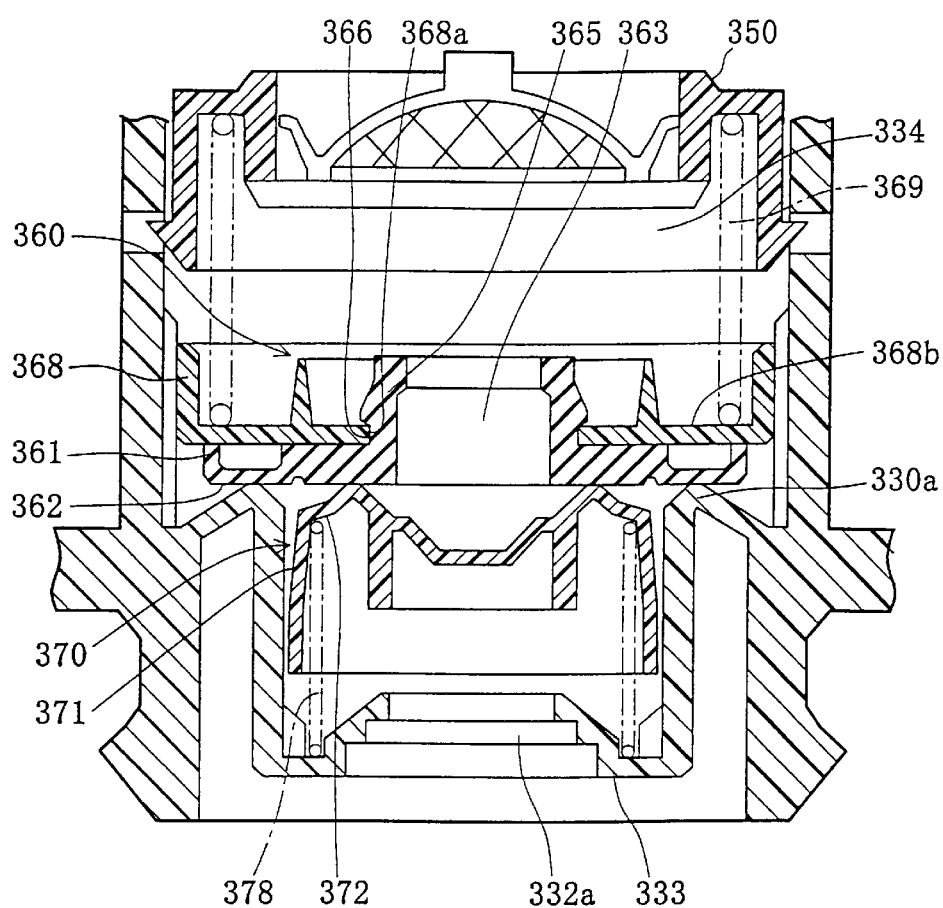
FIG. 19 is a cross section of an enlargement of the periphery of the negative pressure valve and positive pressure valve in the fuel cap.

FIG. 19 is a cross section of an enlargement of the periphery of the negative pressure valve 370 and positive pressure valve 360 in the fuel cap 310. The positive pressure valve 360 comprises a fluororubber or similar valve element 361, valve retainer 368, and coil spring 69. The valve element 361 is a disk with a seat surface 362 on the bottom surface. A fitting member 365 with a valve flow hole in the center is formed. A side support recess 366 is formed on the side of the fitting member 365. The valve element 361 is attached to the valve retainer 368 by being inserted into the fitting hole 368a of the valve retainer 368. A spring support 368b is formed on the top surface of the valve retainer 368. The spring support 368b supports one end of the coil spring 69, and supports the other end at the outer peripheral bottom surface of the inner lid 350 to support the coil spring 69 in the space between the inner lid 350.

The pressure in the fuel tank is adjusted by the positive pressure valve 360 in the structure by means of the following operations. That is, when the tank pressure increases beyond a certain pressure while the fuel cap 310 is fitted to the filler neck FN (see FIG. 16), the valve element 361 and valve retaining member 368 rise up against the urging force of the coil spring 69, allowing the interior of the fuel tank to communicate with the outside air via the interior of the valve chamber 334. When the interior of the fuel tank falls below a certain pressure in this state, the urging force of the coil spring 69 causes the valve element 361 to drop down, closing the valve. The valve element 361 thus opens and closes according to the pressure differential exerted on the valve element 361.

The negative pressure valve 370, on the other hand, comprises a resin valve element 371, and a coil spring 78 urged against the valve element 371 across the space between the spring support step 372 and bottom wall 333 of the valve element 371. A seat component 376 that attaches to and detaches from the valve element 361 of the positive pressure valve 360 is formed at the top of the valve element 371.

The pressure in the fuel tank is adjusted by the negative pressure valve 370 having the structure by the following operations. That is, when the pressure differential exerted on the valve element 371 reaches a certain level as the pressure in the interior of the fuel tank becomes negative relative to atmospheric pressure, then the valve element 371 moves down against the urging force of the coil spring 78, and the valve element 371 separates from the seat surface 362 of the valve element 361. At this time, the valve element 361 is seated on the seat 330a, and a passage is formed between the valve element 371 and valve element 361 to maintain that state. This allows the fuel tank to communicate with the outside air to release the negative pressure in the fuel tank through the passage between the valve element 371 and the inner cylinder 332, and the passage hole 333a in the bottom wall 333. When the pressure differential exerted on the valve element 371 falls below the urging force of the coil spring 78, the valve element 371 is closed.

When the differential pressure exerted on the valve element 361 of the positive pressure valve 360 passes a certain level as the tank pressure increases, the valve element 361 moves up against the urging force of the coil spring 69, causing the positive pressure valve 360 to open. On the other hand, when the differential pressure acting on the valve element 371 of the negative pressure valve 370 passes a certain pressure as the tank pressure drops, the valve element 371 moves down, causing the negative pressure valve 370 to open. That is, the tank pressure of the fuel tank becomes either positive or negative relative to atmospheric pressure, and when a certain level is exceeded, the positive pressure valve 360 or negative pressure valve 370 opens to allow the pressure to be adjusted to within a prescribed range relative to the outside air. When the valve element 361 of the positive pressure valve 360 opens, the valve element 371 of the negative pressure valve 370 simultaneously rise up, but at that time, communication with the outside is established through the passage on the side of the valve element 371.

In FIG. 17, top engagement catches 331a are formed at the top of the outer cylinder 331. The top engagement catches 331a engage with the inside upper surface of the cam ring 390. That is, four engagement holes 390a (2 shown in Fig.) are formed in the peripheral direction in the outer periphery of the cam ring 390. The top engagement catches 331a pass through the engagement holes 390a and engage the engagement recess 390b on the upper surface of the cam ring 390, so that the cam ring 390 is attached to the top of the outer cylinder 331. This causes the sliding casing 330 to move up and down in a unitary manner with the cam ring 390.

A spring detent end 331b is provided at the base of the guide protrusion 335. The spring detent end 331b suspends the spring 400 between it and the cam protrusion 324 of the rotating casing 320. The spring 400 urges in such a way as to press the sliding casing 330 down against the rotating casing 320. Since the upper engagement catch 331a is engaged via the cam ring 390 against the rotating casing 320, the sliding casing 330 is slidable while the spring 400 is urged against the rotating casing 320. A seal retainer 337 is also formed at the bottom surface of the guide protrusions 335 of the sliding casing 330, and the gasket GS2 is held by this seal retainer 337.

Figure 20:
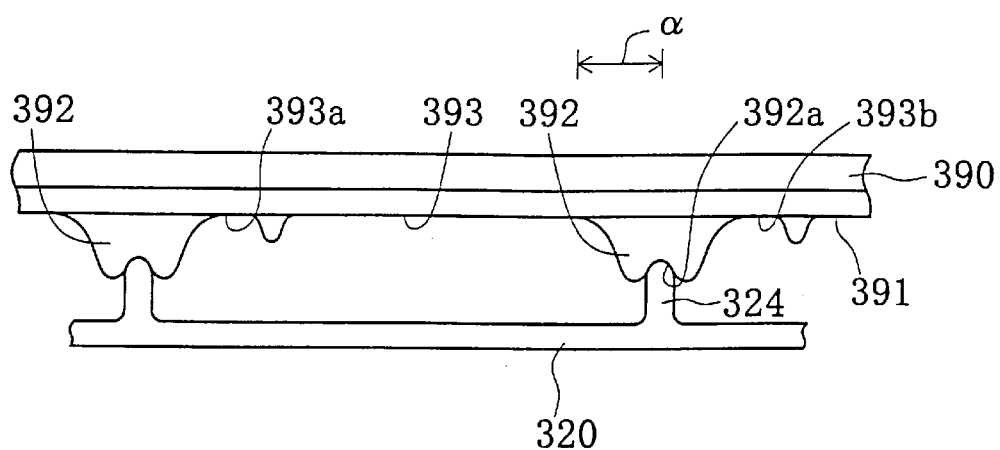
FIG. 20 is an illustration of the deployment of the cam ring forming the cam mechanism.

FIG. 20 is an illustration of the deployment of the cam ring 390 forming the cam mechanism. The cam ring 390 is a member that operates in such a way that the sliding casing 330 moves up and down as the rotating casing 320 in FIG. 17 rotates. The cam ring is a round ring of varying vertical thickness, the bottom surface of which serves as a cam surface 391. The cam surface 391 is the surface followed by the cam protrusion 324 integrated with the rotating casing 320, and comprises peaks 392 and a virtually horizontal flat component 393 formed between the peaks 392. Cam recesses 392a are formed in the apices of the peaks 392, and a cam recess 393a is formed at a location peripherally separated from the peaks 392. The cam recesses 392a and 393a are recesses for positioning the cam protrusion 324. Here, as described above, the spring 400 is urged in the direction shortening the distance between the cam ring 390 and the rotating casing 320. Thus when the cam protrusion 324 moves from the right side in the Figure to the left while positioned in the cam recess 392a as shown in FIG. 20, it travels down the slope of the peak 392 and moves onto the flat component 393 until it reaches the cam recess 393a and is positioned there. The relation between the cam mechanism and the opening and closing of the fuel cap 310 is described below.

Figure 21A:
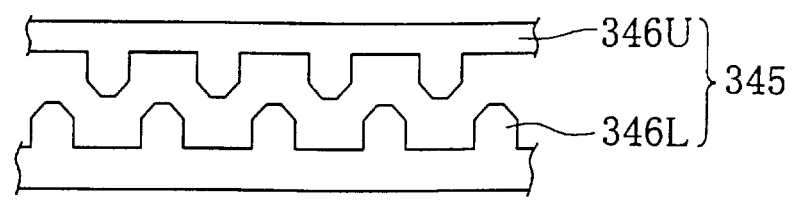
FIGS. 21A and 21B illustrate the unengaged state of the clutch means.
Figure 21B:
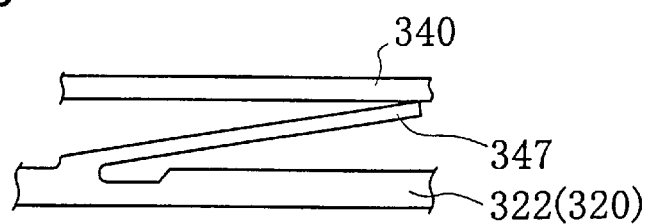
Figure 22A:
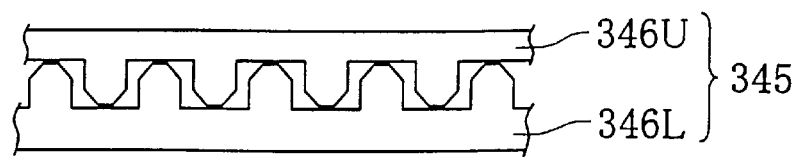
Figure 22B:
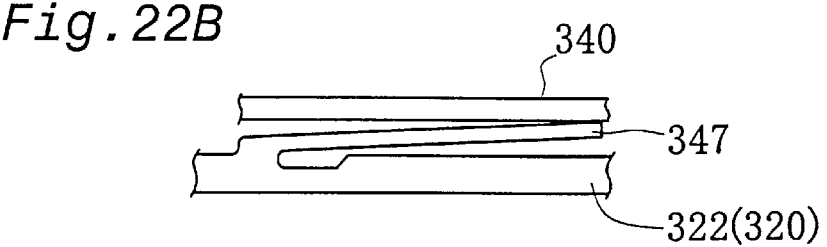

A clutch means comprising a clutch 345 and clutch spring 347 is provided between the lid 340 and flange 322 as shown in FIG. 17. FIGS. 21 and 22 illustrate the clutch means. FIG. 21 illustrates the clutch 345 in an unengaged state, and FIG. 22 illustrates the clutch 345 while engaged. The clutch 345 as shown in FIG. 21A comprises an upper gear 346U provided under the bottom surface of the lid 340, and a lower gear 346L provided above the upper surface of the rotating casing 320. As shown in FIG. 21B, the clutch means comprises a clutch spring 347 disposed on the periphery of the clutch 345. The clutch spring 347 is formed of a cantilever piece in the form of a plate spring protruding downward at an angle from the top surface of the flange 322, and presses at the free end onto the bottom surface of the lid 340.

While the free end of the clutch spring 347 shown in FIG. 21 presses the bottom surface of the lid 340, the upper gear 346U and lower gear 346L do not engage each other. When the lid 340 presses down from the unengaged state against the urging force of the clutch spring 347, the upper gear 346U and lower gear 346L are engaged. When the lid 340 is rotated in this engaged state, the rotating casing 320 also rotates in a unitary manner.

The operations by which the fuel cap 310 opens and closes the inlet FNb and the accompanying sealing operations of the gasket GS2 are described below. FIGS. 23 through 26 are cross section of a series of operations for closing the inlet FNb with the fuel cap, while FIGS. 27A through 29B illustrate the operations of the cam mechanism.

Figure 23:
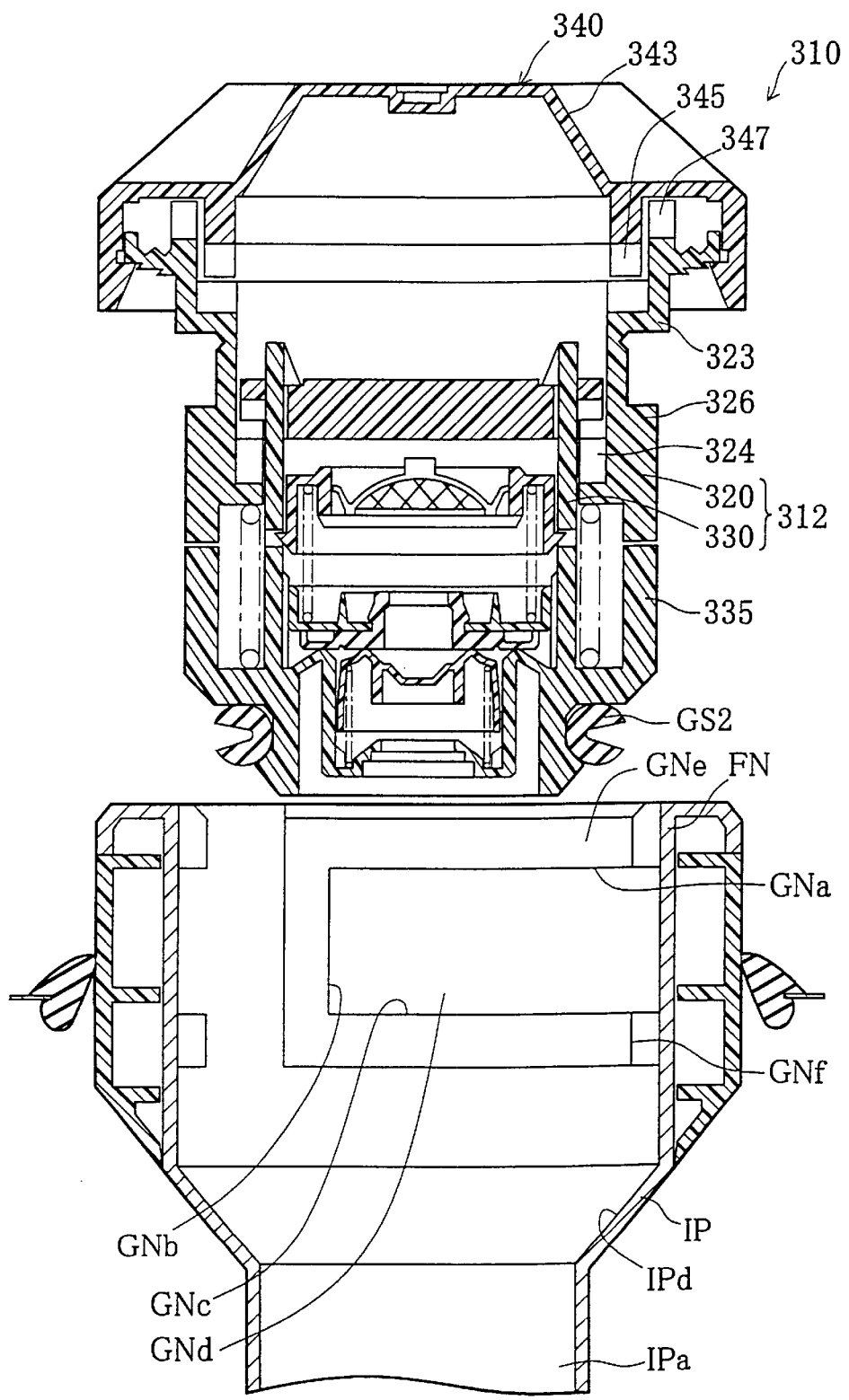
FIG. 23 is a cross section of the fuel cap before being mounted on the filler neck.

While the fuel cap 310 is mounted on the filler neck FN as shown in FIG. 23, the cam protrusion 324 depicted in FIG. 20 is positioned in the cam recess 392a of the peak 392 where the cam ring 390 is thickest. The sliding casing 330 thus is positioned at the highest location relative to the rotating casing 320.

Figure 24:
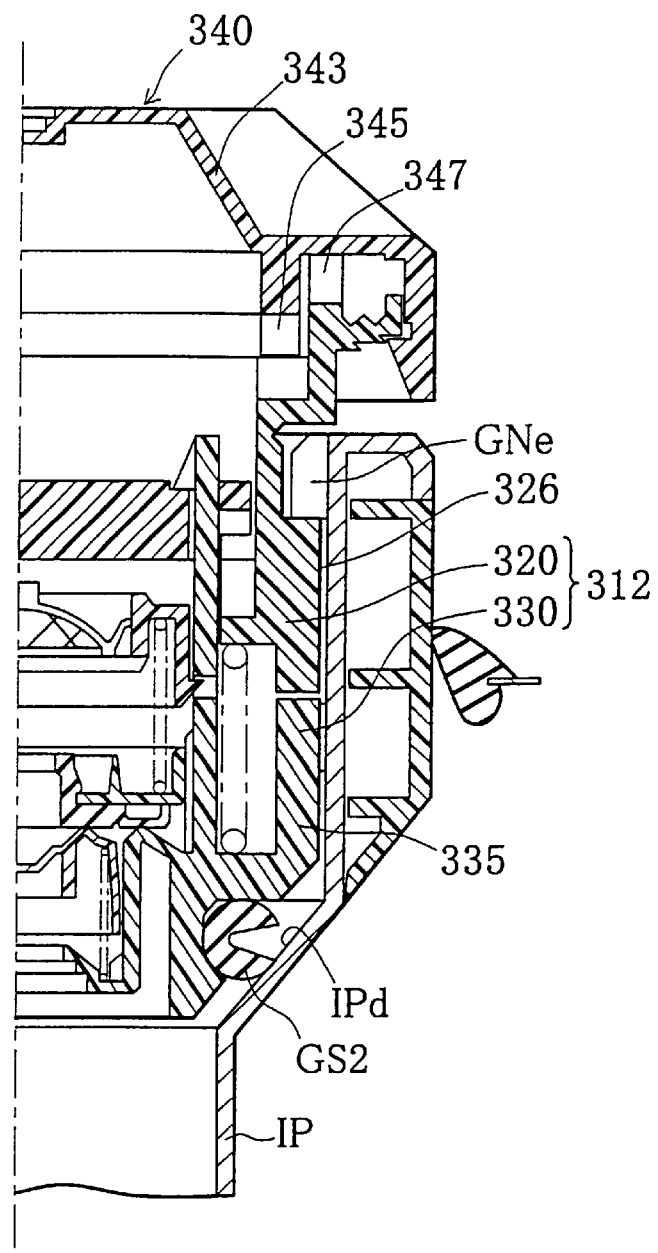
FIG. 24 is a semi-cross section of operations subsequent to FIG. 23.

The handle 343 of the lid 340 is taken in hand as shown in FIG. 23, and the support ends 326 of the rotating casing 320 and the guide protrusions 335 of the sliding casing 330 are aligned with the insert notches GNe of the filler neck FN (FIG. 18B) to insert the casing 312 into the filler neck FN (state in FIG. 24). As a result, the guide protrusions 335 are positioned at the end of the rotating detent GNf, as shown in FIG. 27B, so the rotation of the sliding casing 330 is regulated relative to the filler neck FN.

Figure 25:
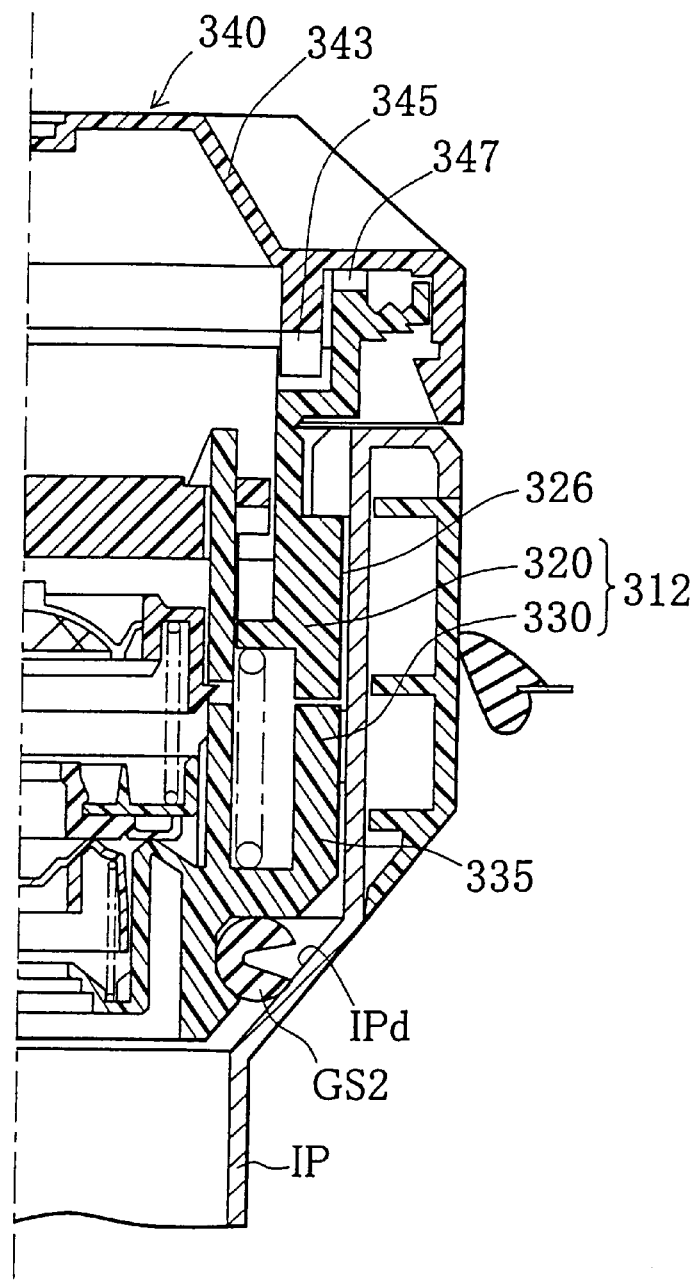
FIG. 25 is a semi-cross section of operations subsequent to FIG. 24.
Figure 26:
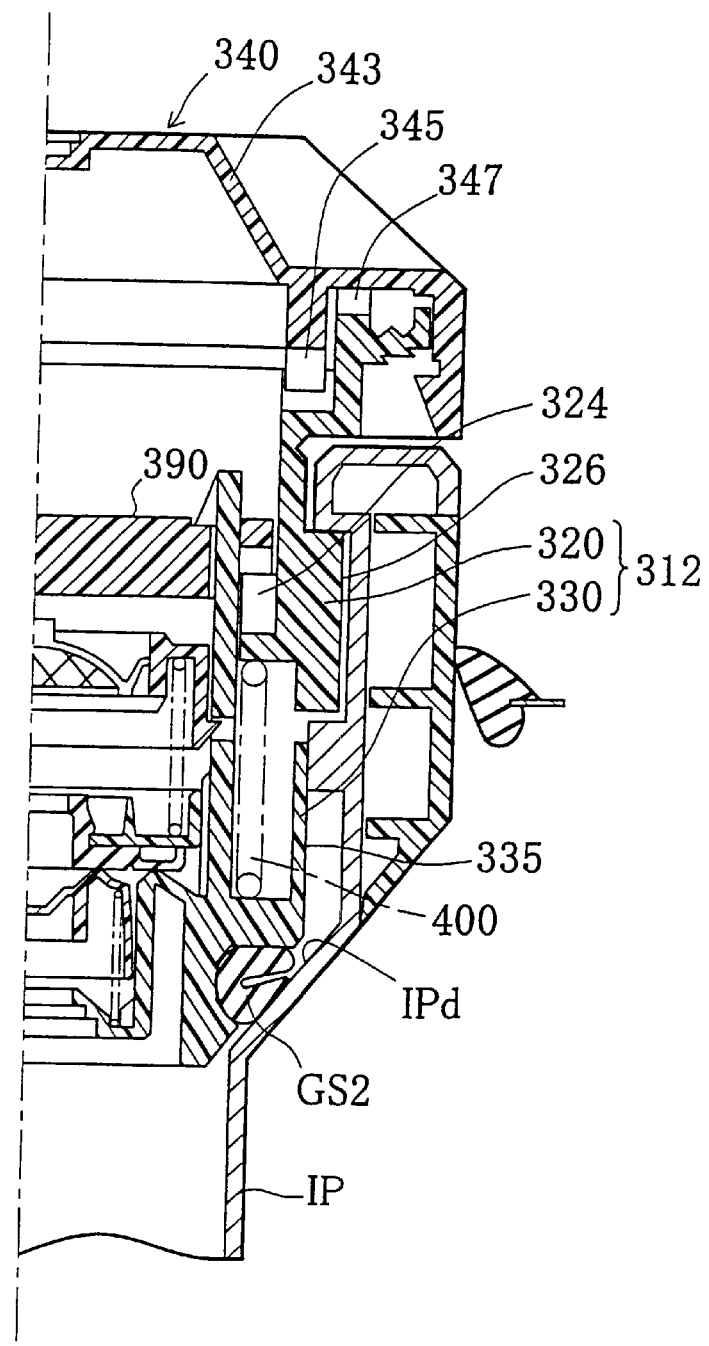
FIG. 26 is a semi-cross section of operations subsequent to FIG. 25.

Then, as shown in FIG. 25, the lid 340 is pressed down against the urging force of the plastic spring 347, and the clutch 345 is engaged (state in FIG. 22). When the lid 340 is rotated clockwise, the rotating casing 320 rotates clockwise with the lid 340 (state in FIG. 26). At this time, the cam mechanism moves from the state in FIG. 27A to that in FIG. 28A. That is, the cam protrusion 324 disengages from the cam recess 392a of the cam ring 390, travels down the sloped surface of the peak 392, and moves to the flat component 393. At this time, the support ends 326 are guided by the guide groove GNd, and the movement upwards is regulated by the top stopper wall GNa, so that the sliding casing 330 is moved downward by the accumulated spring force in the spring 400 (FIG. 26). That is, the distance between the cam spring 390 and the cam protrusion 324 is shortened, and the sliding casing 330 is moved downward by the urging force of the spring 400. As a result, the gasket GS2 is pressed to the set surface TPd to create a seal in the space there. When the lid 340 is further rotated, the cam protrusion 324 moves while following the flat component 393, as shown in FIG. 29A the support ends 326 move in the guide groove GNd, and the fuel cap 310 stops the rotation to conclude the closing operation while the cam protrusion 324 is positioned in the cam recess 393a (state in FIG. 16).

The operations for removing the fuel cap 310 from the filler neck FN are described below. When the lid 340 is pressed down, and the clutch 345 is engaged for counter-clockwise rotation to move from the state in FIG. 16 to the state in FIG. 26, the cam protrusion 324 disengages from the cam recess 392a of the peak 392, as shown in the transition from FIG. 29A through FIG. 28A to FIG. 27A. At this time, the cam protrusion 324 rides up into the peak 392, thereby pushing the sliding casing 330 against the urging force of the spring 400. This allows the gasket GS2 mounted at the bottom of the sliding casing 330 to separate from the seat surface IPd. In this state, as shown in FIG. 27B the support end 326 of the rotating casing 320 are aligned with the insertion notches GNe, resulting in a position where the fuel cap 310 is taken out. The fuel cap 310 is picked up, so that the fuel cap 310 is removed, allowing a fuel gun to be inserted into the inlet FNb for fueling.

The fueling mechanism with the fuel cap 310 affords the following action and effects.

1) When the fuel cap 310 is operated to close the inlet FNb, the sliding casing 330 moves downward due to the rotation of the rotating casing 320, creating a seal with the gasket GS2. The gasket GS2 is subject to uniform compression force in the vertical direction by the spring 400, without any torque as in the past, resulting in more uniform sealing force.

2) When the fuel cap 310 is closed, the gasket GS2 is pressed by the spring 400, sealing the seat surface IPd. That is, it is subject to no torque, resulting in better durability.

3) When the fuel cap 310 is opened and closed, there is no significant sliding resistance from the gasket GS2, and when the fuel cap 310 is operated, no rotating torque is needed, making it easier to operate.

4) The gasket GS2 is provided in the passage on the tank main body side from the cam mechanism, so that no separate sealing component need be provided in locations where the cam mechanism slides, thus affording a simpler structure.

5) When the fuel cap 310 of the present invention is operated to open and close the inlet, the handle 343 is pressed against the urging force of the plastic spring 347, so that the clutch 345 is engaged, and the handle 343 may be rotated while the clutch 345 is engaged. When the fuel cap 310 closes the inlet FNb, the clutch 345 is in an unengaged state due to the urging force of the plastic spring 347. Since the clutch 345 is thus in an unengaged state, even when the handle 343 is subject to force in the rotating direction from unexpected external force, the handle 343 rotates without catching relative to the casing. The casing 312 thus is not subject to external force, in the form of rotating force, exerted on the handle, and the closed state of the inlet FNb can accordingly be preserved. As such, even when unexpected external force acts on the fuel cap 310, the fuel cap 310 will not come loose, and the seal may be preserved.

6) While the clutch 345 is in an unengaged state, the handle 343 may be rotated without catching, so as to be aligned. The user can thus rotate the handle 343 to the preferred position, further improving opening and closing operations.

7) The spring 400 forming the clutch means is formed of a cantilever piece unitarily protruding from the upper surface of the rotating casing 320, preventing the number of parts from being increased.

Figure 30:
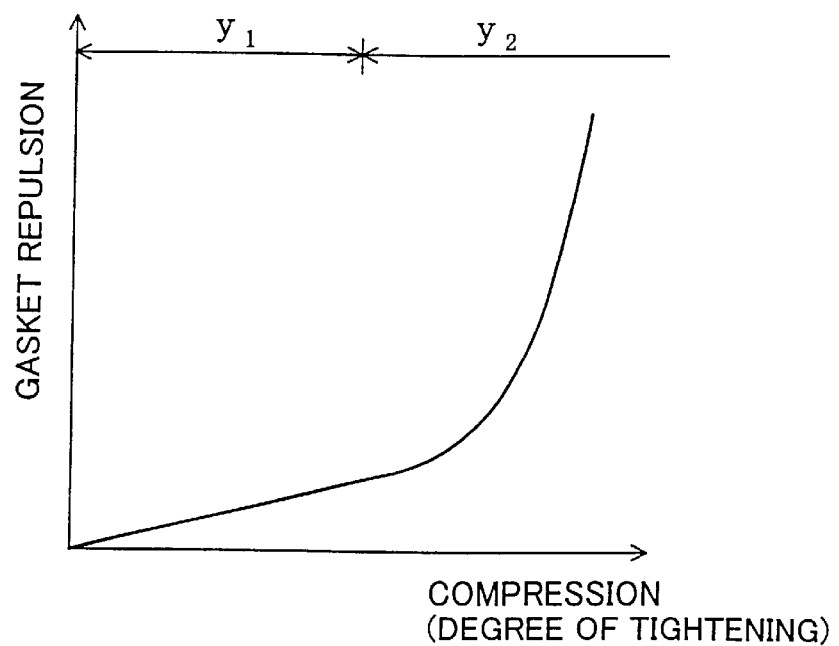
FIG. 30 is a graph of the relation between the repulsion force of the gasket and the compression (extent of tightening) when the gasket is squeezed.

8) The operating angle for opening and closing the fuel cap 310 is 90 to 180°, but, as shown in FIG. 20, the angle of disengagement α up to where the cam protrusion 324 separates from the cam recess 392a is a small angle of 5 to 10° allowing it to descend the sloped surface of the peak 392. Since it is thus possible to obtain a seal at such a small angle, the operations are easier to manage. Moreover, even when the gasket GS2 is compressed at such a low operating angle, a reliable seal may be obtained. FIG. 30 is a graph of the relation between the repulsion force of the gasket and the compression (amount of tightening) when the gasket is squeezed. In FIG. 30, the repulsion force of the gasket increases slightly (y1) at the initial compression, but readily increases (y2) as the compression increases. That is, a low level force is sufficient for the gasket to give significant compression at the initial stages, but considerable force is needed for compression at stages of a certain level of compression. Despite the initial compression stage (y1), when the gasket is more vigorously compressed, the repulsion force is too great to ensure satisfactory sealing properties or leads to greater torque for rotating the fuel cap 310. However, in the embodiment described above, after the cam protrusion 324 has descended the peak 392, the urging force of the spring 400 is gradually released, and the gasket GS2 is compressed. The repulsion force of the gasket GS2 is also low, making considerable torque unnecessary to rotate the fuel cap 310, while affording better sealing properties. Here, the angle α up to where the cam protrusion 324 descends the peak 392 should be 5 to 90°, and even more preferably 5 to 45°.

9) The gasket GS2 is also located on the side of the tank main body except for the sliding location in the cam mechanism, so there is no need to provide separate sealing component in the sliding location in the cam mechanism, allowing the structure to be simplified.

Figure 31:
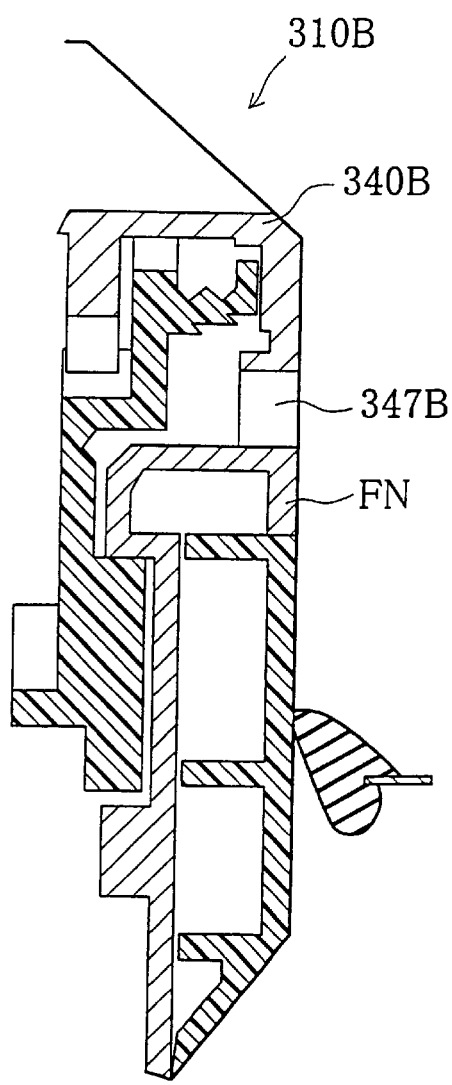
FIG. 31 is a cross section of the upper part of the fuel cap in another embodiment of the invention.

FIG. 31 is a cross section of the top of the fuel cap 310 in another embodiment. In FIG. 31, the clutch means comprises a clutch spring 347B protruding from the bottom end of the side wall of the lid 340B. The lid 340B and clutch spring 347B are formed of a conductive resin. The free end of the clutch spring 347B extends so as to come into contact with the upper surface of the filler neck FN. The clutch spring 347B acts as a ground path through which the charge built up in the lid 340B escapes to the filler neck. The clutch spring 347B thus acts as a spring and as a ground path, making it unnecessary to provide a separate ground path and affording a simpler structure.

The following variants are also possible.

1) The sealing component may be mounted on the casing body, but can also be mounted in other locations such as on the inside wall surface of the inlet pipe, and may be given various other shapes.

2) In the embodiments, the spring forming the clutch means was unitarily formed with the lid 340 by means of a plate spring, but this is not the only possible structure. Various other means may be used, such as coil springs, provided that the structure urges between the handle and the casing. Such means may also be formed of separate parts in addition to being formed in a unitary manner.

Figure 32:
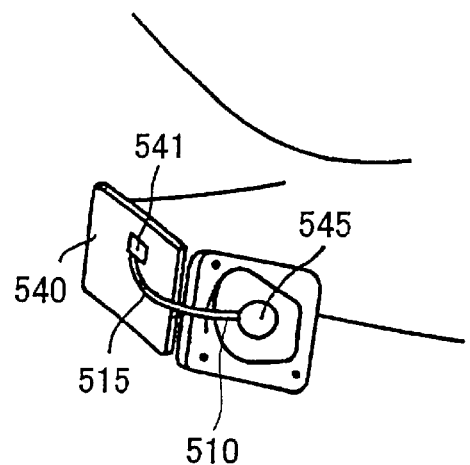
FIG. 32 is an illustration of the periphery of the fueling opening in the lid panel in the rear of a vehicle.
Figure 33:
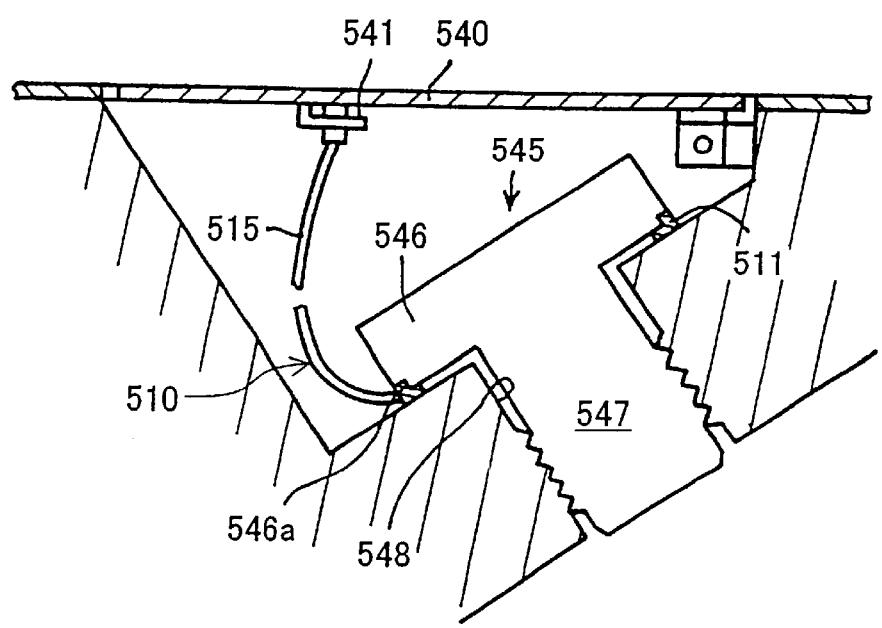
FIG. 33 is a cross section of the fuel cap and cap detent.

The fuel cap in a fourth embodiment of the present invention is described below with reference to FIGS. 32 through 43. FIG. 32 illustrates the periphery of a fueling inlet of the lid panel in the rear of a vehicle. FIG. 33 is a cross section of the fueling inlet, fuel cap, and cap detent. In FIGS. 32 and 33, An opening that is opened and closed by a lid panel 540 is provided in the rear of a vehicle. A fueling inlet 548 is provided in this opening. The fueling inlet 548 is opened and closed by the fuel cap 545. A cap detent 510 is attached to the outer periphery of the top of the fuel cap 545.

Figure 34:
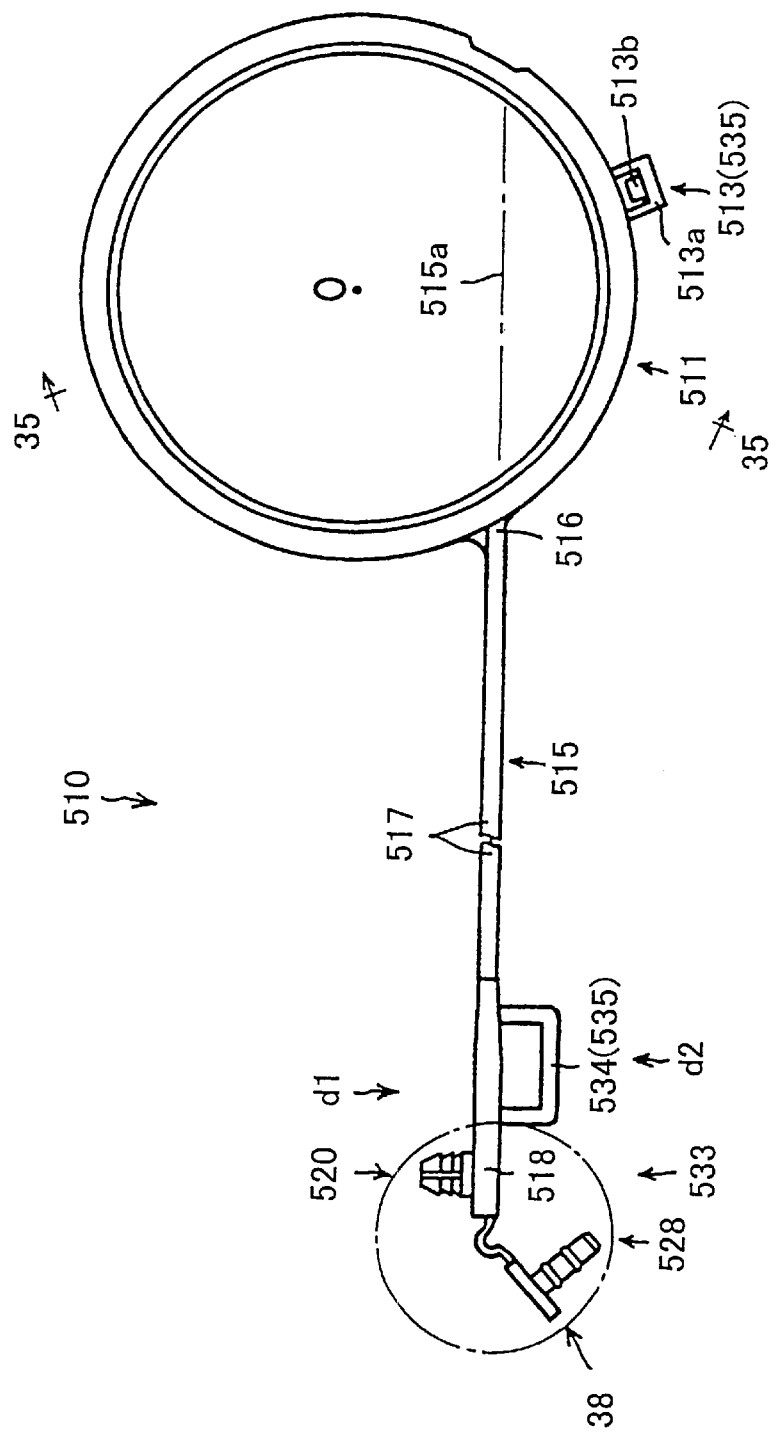
FIG. 34 is a front view of the cap detent.

FIG. 34 is a front view of the cap detent 510. As shown in FIG. 34, the cap detent 510 is unitarily formed of the soft resin TPEE (Pelpuren), and comprises a cap retaining ring 511 for holding the fuel cap 545 (see FIG. 33), a cord-shaped flexible tether 515 extending from the cap retainer ring 511, a vehicle attachment component 533 for attaching the support end 518 of the tether 515 to the lid panel 540 (see FIG. 33), and detachable components 535. The detachable component 535 comprises a detent 513 formed with the cap retainer ring 511, and an engaged component 534 formed near the vehicle attachment component 533. The fuel cap 545 engages with the cap detent 510.

Figure 35:
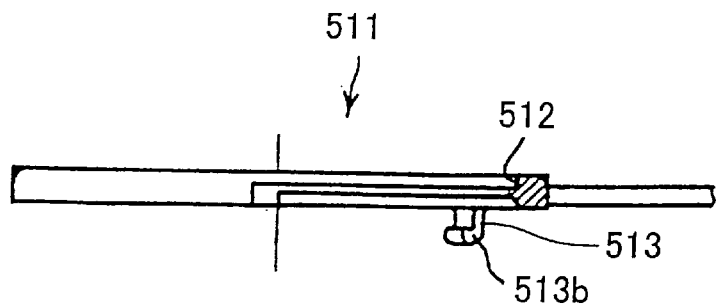
FIG. 35 is a cross section along line 35—35 in FIG. 34.

The cap retainer ring 511 as a whole in ring-shaped, with a generally rectangular cross section. FIG. 35 is a cross section along line 35—35 in FIG. 34. A ring-shaped step 512 is formed in the middle in the heightwise direction on the inner peripheral surface of the cap retainer ring 511. The step 512 makes the inside diameter of the bottom end surface side of the cap retainer ring 511 smaller than the inside diameter of the top end surface side. The inside diameter of the cap retainer ring 511 is formed smaller than the external shape of the head 546 of the fuel cap 545 depicted in FIG. 33. This structure allows the fuel cap 545 to rotate inside the cap retainer ring 511.

As shown in FIG. 34, the tether 515 extends from the connecting end 516 of the cap retainer ring 511 at an angle where the line of extension forms the hypotenuse 515a of the cap retainer ring 511. The line connecting the connecting end 516 and the center O of the cap retainer ring 511 is virtually at right angles to the line connecting the detent 513 and the center O of the cap retainer ring 511.

The tether 515 extends into the flat plane (floor surface in FIG. 34) present in the cap retainer ring 511. The vicinity of the connecting end 516 and the intermediate component 517 is formed with a cross sectional circle or rectangular shape, and may be easily bent in any direction.

Figure 36:
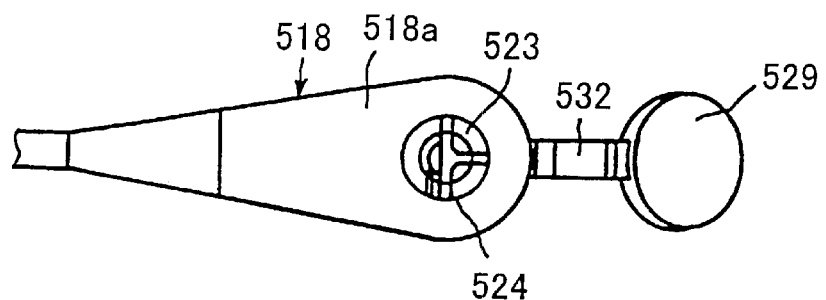
FIG. 36 is a view along the arrow in direction d1 in FIG. 34.
Figure 37:
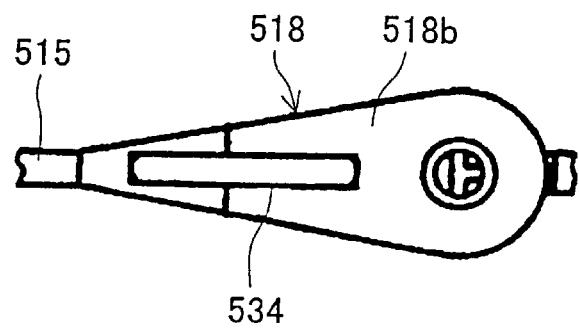
FIG. 37 is a view along the arrow in direction d2 in FIG. 34.
Figure 38:
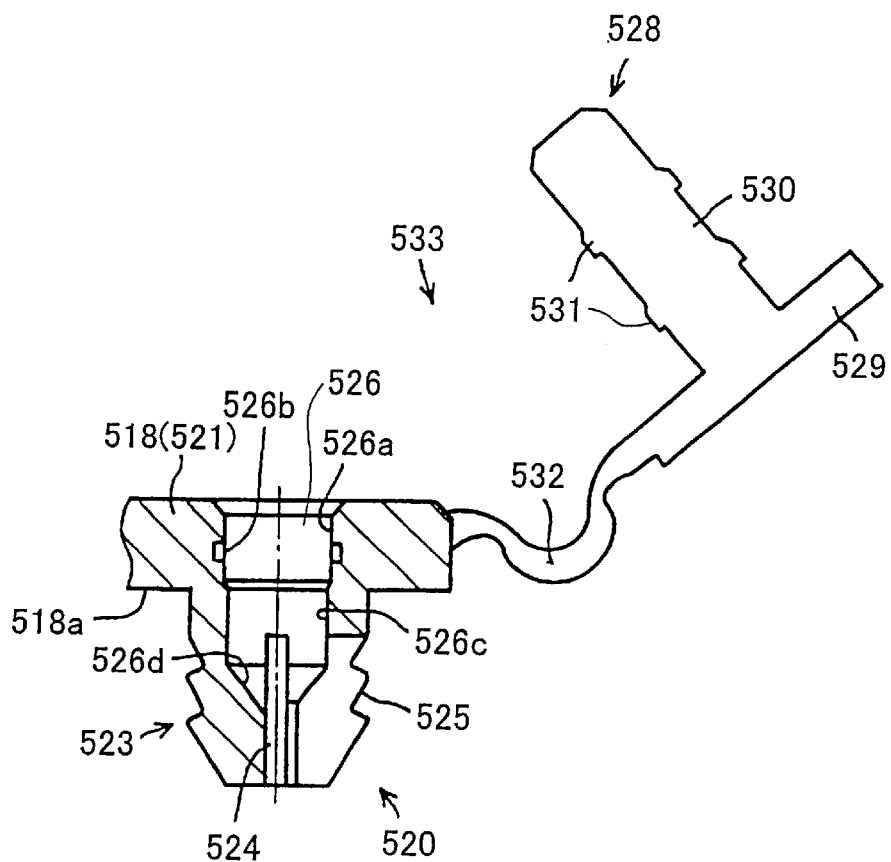
FIG. 38 is a cross section of the clip main body.

FIG. 36 is a view along the arrow in direction d1 in FIG. 34. FIG. 37 is a view along the arrow in direction d2 in FIG. 34. As shown in FIGS. 36 and 37, the support end 518 has a cross sectional flat shape wider than the other parts, and widens into a plane virtually perpendicular to the plane in which the cap retainer ring 511 lies. At the support end 518, a hollow core 528 is formed at the tip, a clip main body 520 is formed in the portion somewhat back from the tip, and an engaged detent 534 is formed in the portion further back from the tip. These are described below.

Figure 39:
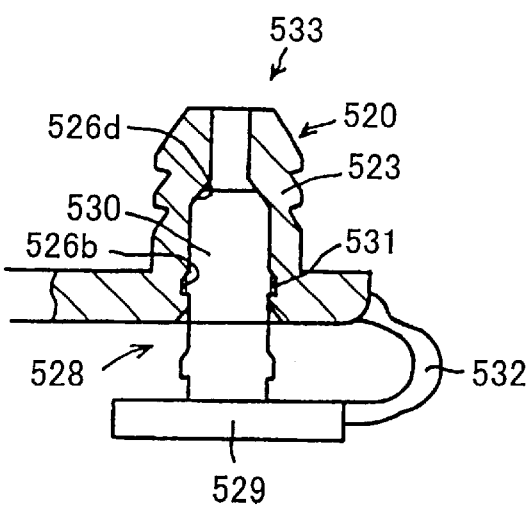
FIG. 39 is a cross section of a partial cutaway around the clip main body.

FIG. 39 is a partial cutaway of the vicinity of the clip main body 520. The clip main body 520 comprises a base 521 forming part of the support end 518, and a cylinder 523. In the cylinder 523, a slit 524 is formed diametrically midway into the bottom end side opening shown in FIG. 38. The slit 524 is able to widen the tip of the cylinder 523. The cylinder 523 comprises a ring-shaped protrusion 525 on the outer peripheral surface, and an insertion groove 526 on the inner peripheral surface. The insertion groove 526 is composes of a large diameter component 526a with a ring-shaped groove 526b from the base 521, an intermediate diameter component 526c, and a conical component 526d.

The hollow core 528 comprises a base 529 and a round rod 530. The round rod 530 has a length corresponding to the sum of the length of the cylinder 523 and the width of the base 521 of the clip main body 520. The outer shape of the round rod 530 is virtually the equivalent of the inside diameter of the intermediate diameter component 526c of the cylinder 523. Two ring-shaped protrusions 531 are separately formed in the axial direction on the outer peripheral surface of the round rod 530. The hollow core 528 is connected to the support end 518 by a connector 532 that is thinner than the base 529 in the radius of the base 529. The connector 532 flexibly connects the base 521 and the base 529 of the hollow core 528 at an angle of 90 to 180 degrees. The clip main body 520 and the hollow core 528 constitutes the vehicle attachment component 533.

The operations involved in attaching the support end 518 of the tether 515 to the lid panel 540 at a location on the vehicle attachment component 533 are described below.

As shown in FIG. 39, when the cap detent 510 is not being used to stop the fuel cap 545, it is handled while the hollow core 528 of the vehicle attachment component is inserted midway into the clip main body 520. In this state, the tip of the round rod 530 reaches only to the cone component 526d of the cylinder 523, and the diameter of the cylinder 523 is widened virtually not at all. The ring-shaped protrusion 531 by the tip of the round rod 530 engages with the cone component 526d of the large diameter component 526a of the cylinder 523. This prevents the hollow core 528 from falling off of the clip main body 520.

Figure 40:
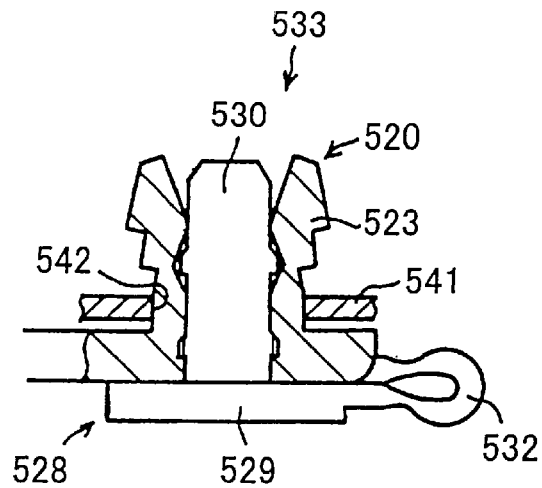
FIG. 40 is a cross section of the core inserted into the clip main body.

The lid panel 540 in FIGS. 32 and 33 is opened to allow the clip main body 520 to be inserted in the through hole 542 of the attachment component 541 formed on the inside surface, as shown in FIG. 40, and the round rod 530 of the hollow core 528 is inserted into the cylinder 523. The cylinder 523 diametrically expands as the round rod 530 is inserted, so as to engage with the edge of the through hole 542 at the step 525. This allows the support end 518 of the tether 515 to be attached to the inner surface of the lid panel 540.

Meanwhile, as shown in FIG. 33, when fueling is not being done, the cap detent 510 holds the step 546a of the bottom end edge of the head 546 of the fuel cap 545 by means of the cap retainer ring 511. The fuel cap 545 screws the male threading of the leg 547 to the female threading of the inlet 548. The lid panel 540 closes the opening.

The following is a description of the detachable component 535 engaging with the tether 515 of the cap retainer ring 511 during fueling.

As shown in FIG. 34, the detachable component 535 comprises a detent 513 and an engaged component 534. The detent 513 comprises a component 513a in the form of a square with one side missing, that protrudes radially outward from the outer peripheral surface of the cap retainer ring 511, and an L-shaped component 513b (FIG. 35) that extends from midway in the above component 513a in the axial direction of the cap retainer ring 511, with the tip bent radially inward. As shown in FIG. 37, the engaged component 534 is a component in the form of a square with one side missing at the other surface 518b of the support end 518 of the tether 515 (see FIG. 37), extends in the same direction as the direction in which the support end 518 extends, and protrudes in the thicknesswise direction of the support end 518.

During fueling, the lid panel 540 is opened to the left in FIG. 32 (clockwise direction in FIG. 33), and the fuel cap 545 is removed from the inlet 548. At this time, the cap retainer ring 511 is rotatably holding the fuel cap 545, so the cap retainer ring 511 does not impede the rotation of the fuel cap 545.

After the fuel cap 545 has been removed from the inlet 548, the tether 515 is bent, and the detent 513 of the cap retainer ring 511 is moved toward the engaged component 534 of the support end 518 of the tether 515. In this embodiment, as shown in FIG. 32, the support end 518 of the tether 515 is attached to the lid panel 540 which opens to the left, and the fuel cap 545 is located to the right of the lid panel 540. The tether 515 is thus bent in the shape of a reverse C. The middle part of the tether 515 has a rectangular cross section, and is thus easily bent.

Figure 41:
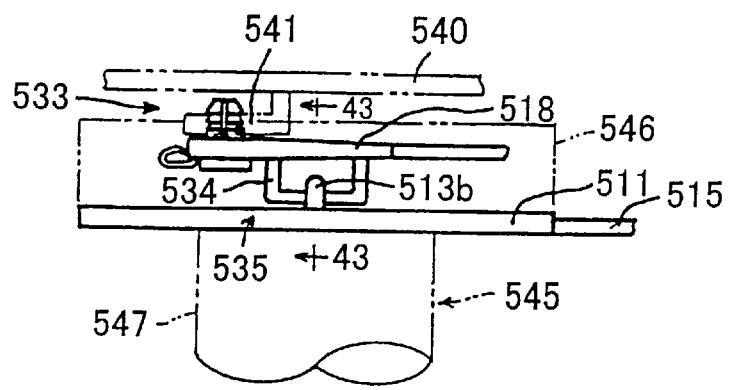
FIG. 41 is an illustration of the fuel cap stopped at the lid panel.
Figure 42:
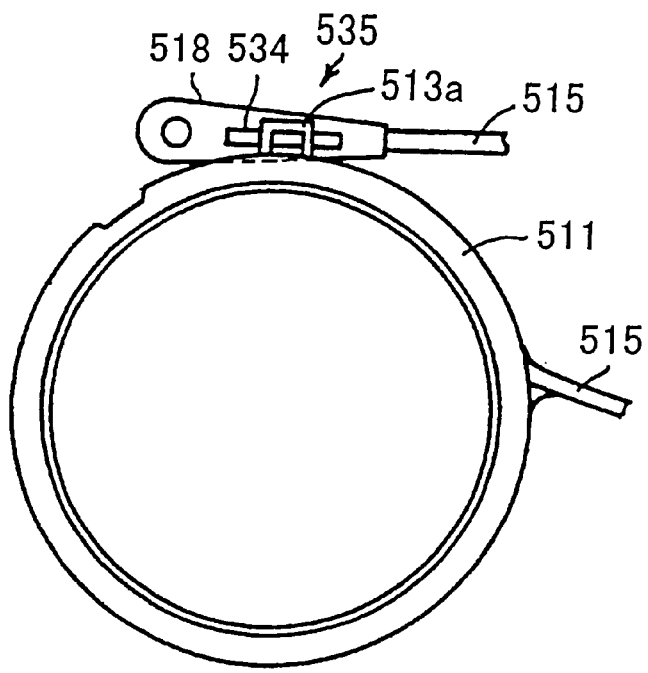
FIG. 42 is an illustration of the fuel cap stopped at the lid panel.
Figure 43:
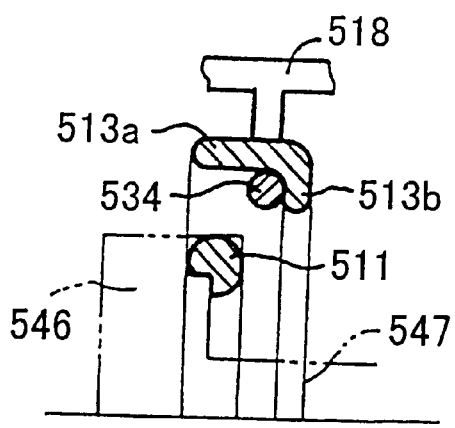
FIG. 43 is a cross section along line 43—43 in FIG. 41.

When the cap retainer ring 511 is brought into the proximity of the support end 518 of the tether 515, the L-shaped component 513b of the detent 513 engages with the engaged component 534, as shown in FIGS. 41, 42, and 43. Since the L-shaped component 513b protrudes radially and axially from the cap retainer ring 511, from in front it readily engages with the engaged component 534. At this time, the head 546 of the fuel cap 545 is held by the cap retainer ring 511, as indicated by the two-dot line in FIG. 41, and the leg 547 extends forward. Because the head 546 of the fuel cap 545, which is shorter (thinner) than the leg 547, is located on the lid panel 540 side, there is no danger of the head 546 and lid panel 540 interfering with each other. Since, furthermore, the center of weight lies in the leg 547 of the fuel cap 545, the tip of the leg 547 descends vertically to a more stable state than the head 546, and is thus prevented from being removed from the cap retainer ring 511. The fuel cap 545 is separated from the body, thus preventing the body from becoming stained by gasoline clinging to the fuel cap 545.

At the conclusion of fueling, The L-shaped component 513b of the detent 513 is removed from the engaged component 534, the fuel cap 545 is moved toward the inlet 548 and attached to the inlet 548, and the lid panel 540 is closed.

This embodiment affords the following effects.

1) The fuel cap 545 may be stopped by the cap detent 510 because the L-shaped component 513b of the detachable component 535 is provided on the cap retainer ring 511, and because the engaged component 534 is provided on the support end 518 of the tether 515. This makes it unnecessary to provide the lid panel 540 with a detent for stopping the fuel cap 545. The detent 513 of the detachable component 535 is also L-shaped, and the engaged component 534 is in the form of a square with one side missing. The detent component 513 is thus readily attached to and detached from the engaged component 534.

2) Because the hollow core 528 is connected by a connector 532 to the support end 518 of the tether, there is no danger of the core 528 becoming lost, even when the core 528 is dislodged from the clip main body 520 by temporary tensile force on the tether 515. The hollow core 528 may be held by the clip main body 520 while inserted midway into the clip main body 520 (see FIG. 39), so that when the cap detent 510 is not being used, that is, during shipping or storage, etc., the core 528 will not dangle down and interfere with peripheral components.

3) The cap retainer ring 511, tether 515, vehicle attachment component 533, and detachable component 535 of the cap detent 510 are unitarily formed of a soft resin, so there is less danger of break down in the connection between the cap retainer ring 511 and tether 515 or between the core 528 and support end 518 of the tether 515. Because the tether 515, vehicle attachment component 533, and detachable component 535 are located in the plane in which the cap retainer ring 511 is located, molds for injection molding may be readily prepared for easier molding.

4) The fuel cap 545 is easier and more reliable to engage in vehicles on which the lid panel 540 is on the left side of the vehicle (most automobiles in Japan are of this type).

Figure 44:
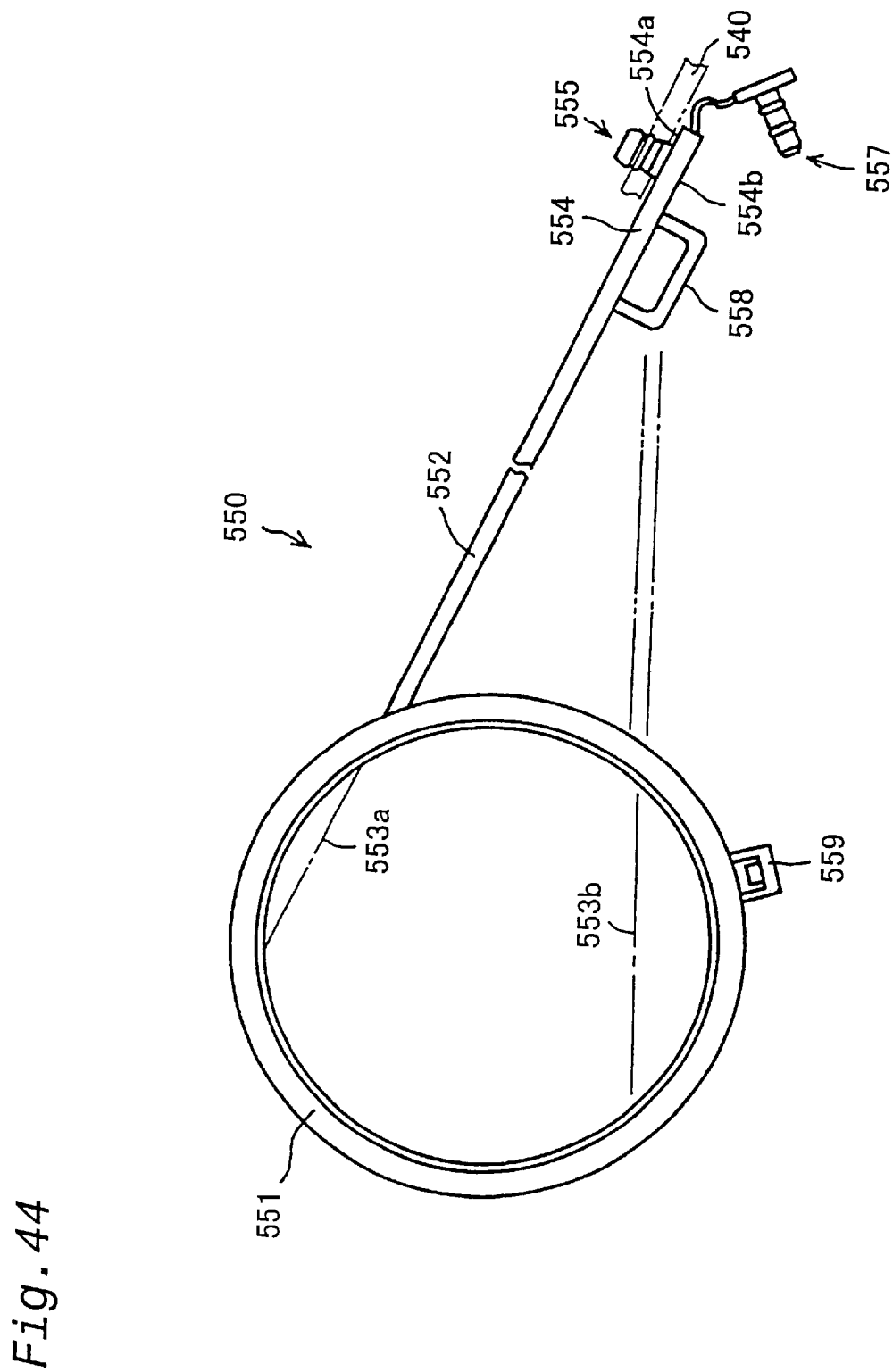
FIG. 44 is a plan of the cap retainer ring in a fifth embodiment.

FIG. 44 is a plane of the cap retainer ring 551 in a fifth embodiment. The cap detent in the fourth embodiment is suitable for vehicles in which the lid panel is on the left side, but automobiles with the lid panel on the right side are also driven in Japan and in Europe and America. Since the lid panel is opened to the right during fueling in this type of automobile, the cap retainer holding the fuel cap is located on the left, and the vehicle attachment component attached to the lid panel is located on the right. The tether of the cap detent thus bends in the form of a C during fueling.

As shown in FIG. 44, the tether 552 extends from the cap retainer ring 551 as shown by the solid line or as shown by the two-dot line. That is, the line of extension of the tether 552 extends so as to form the hypotenuse 553a or 553b of the cap retainer ring 551.

A vehicle attachment component 555 is formed on one surface 554a (upper surface in FIG. 44) of the support end 554 of the tether 552. A core 557 is formed in the tip, and an engaged component 558 is formed in the other surface 554b (bottom surface in FIG. 44). A detent 559 is formed under the cap retainer ring 551, that is, on the same side as the engaged component 558 relative to the tether 552.

The support end 554 of the cap detent 550 is attached to the lid panel 540 by means of the vehicle attachment component 555 and the core 557. While the cap detent 550 holds the fuel cap on the cap retainer ring 551, the tether 552 is bent into the shape of a C to engage the detent 559 with the detachable component 558.

Figure 45A:
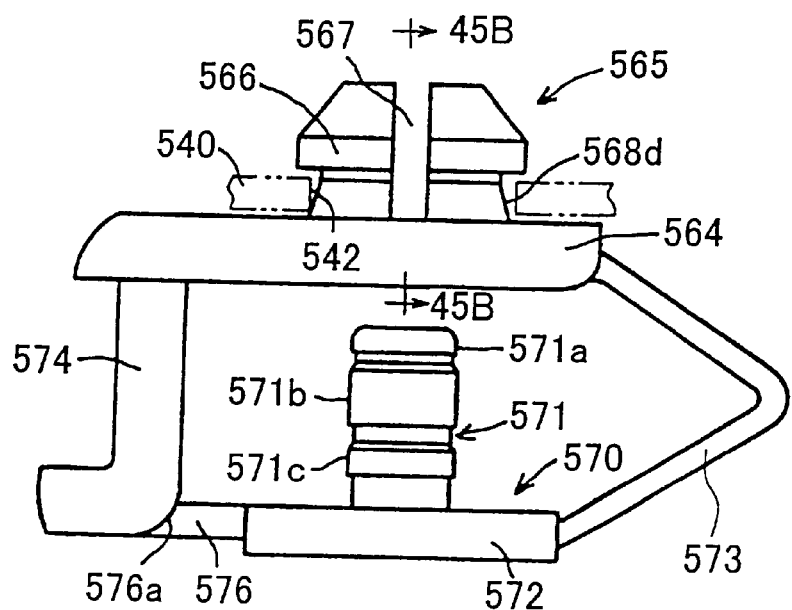
FIG. 45A is a front view of an enlargement of the vehicle attachment component in a sixth embodiment.
Figure 45B:
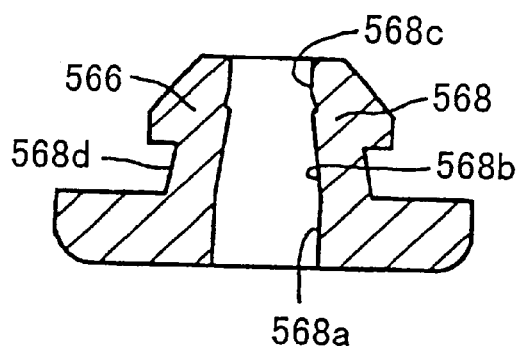
FIG. 45B is a cross section of the cylinder in FIG. 45A.

FIG. 45 depicts a sixth embodiment. FIG. 45A is a front view of an enlargement of the vehicle attachment component, and FIG. 45B is a cross section along line 45B—45B in FIG. 45B.

A cylinder 566 protrudes at the base 564 of the clip main body 565. A slit 567 is formed in the diametric direction from the opening end at the top in the Figure on the cylinder 566. As shown in FIG. 45B, a large diameter component 568a, conical component 568b, and small diameter component 568c are formed on the inner peripheral surface of the cylinder 566. A ring-shaped groove 568d is formed on the outer peripheral surface.

In FIG. 45A, The base 572 of the hollow core 570 is connected through a connector 573 to the base 564. A round rod 571 protrudes at the base 572. Three ring-shaped protrusions 571a, 571b, and 571c are formed on the outer peripheral surface of the round rod 571. This allows the round rod 571 to engage with the conical component 568b, so that the tip of the cylinder 566 diametrically expands to engage with the through hole 542 of the lid panel 540.

The cap detent is formed while the base 572 of the core 570 and the engaged component 574 of the base 564 are connected by a connecting piece 576 during injection molding. The connecting piece 576 is broken along the broken line 576a when used. This prevents the round rod 571 from hanging down from the base 564 during shipping and storage of the cap detent. Although not shown in the figure, the tether extends diametrically from the cap retainer.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A fuel tank fueling device for fueling a tank main body through a fuel passage of an inlet pipe that has neck engagement threading formed on an inner wall thereof, the fuel tank fueling device comprising:

a casing main body detachably mounted on the inlet pipe;

a handle disposed on the casing main body for opening and closing the fuel passage;

a gasket disposed at an upper part of the casing main body for sealing against a seat surface of the inlet pipe;

a spring disposed on the casing main body, the spring constructed and arranged to press the gasket against the seat surface;

an upper cam ring mounted rotatably on a periphery of the casing main body disposed under the gasket, rotation of the upper cam ring being blocked by the neck engagement threading; and a lower cam ring movably mounted in an axial direction on a periphery of the casing main body, wherein the lower cam ring is guided along the upper cam ring at the beginning of the rotating operation of the handle, and is positioned by the neck engagement threading after moving in an axial direction when rotated subsequent to the initial rotation, and is guided in such a way as to press the spring while thus positioned so that the gasket seals the seat surface.

* * * * *